United States Patent
Uhl et al.

(10) Patent No.: US 8,411,794 B2
(45) Date of Patent: Apr. 2, 2013

(54) SYSTEM AND METHOD FOR ARBITRARY PHASE AND AMPLITUDE MODULATION IN AN ANTENNA

(75) Inventors: Brecken H. Uhl, La Mesa, NM (US);
Arthur D. Hurtado, Fairfax, VA (US);
Daniel A. Law, Washington, DC (US)

(73) Assignee: Invertix Corporation, McLean, VA (US)

( * ) Notice: Subject to any disclaimer, the term of this patent is extended or adjusted under 35 U.S.C. 154(b) by 408 days.

(21) Appl. No.: 12/725,773

(22) Filed: Mar. 17, 2010

(65) Prior Publication Data

US 2010/0208844 A1  Aug. 19, 2010

Related U.S. Application Data

(63) Continuation-in-part of application No. 12/277,901, filed on Nov. 25, 2008.

(60) Provisional application No. 61/160,803, filed on Mar. 17, 2009.

(51) Int. Cl.
*H04L 27/00* (2006.01)

(52) U.S. Cl. .................................. 375/299

(58) Field of Classification Search ................. 375/229; 455/129

See application file for complete search history.

(56) References Cited

U.S. PATENT DOCUMENTS

| | | | |
|---|---|---|---|
| 5,048,116 A * | 9/1991 | Schaeffer | 455/561 |
| 5,486,836 A * | 1/1996 | Kuffner et al. | 343/700 MS |
| 5,598,169 A | 1/1997 | Drabeck | |
| 5,825,329 A | 10/1998 | Veghte | |
| 6,061,025 A * | 5/2000 | Jackson et al. | 343/700 MS |
| 6,175,723 B1 * | 1/2001 | Rothwell, III | 455/63.1 |
| 6,243,012 B1 | 6/2001 | Shober | |
| 6,434,372 B1 | 8/2002 | Neagley | |
| 6,950,629 B2 * | 9/2005 | Nagy | 455/63.4 |
| 7,129,892 B2 * | 10/2006 | Borlez et al. | 343/700 MS |
| 7,194,284 B2 * | 3/2007 | Rousu | 455/553.1 |
| 7,298,228 B2 * | 11/2007 | Sievenpiper | 333/101 |
| 7,436,370 B2 * | 10/2008 | Blanton | 343/756 |
| 7,558,555 B2 * | 7/2009 | Nagy | 455/277.1 |
| 8,073,392 B2 | 12/2011 | Babakhani | |
| 2002/0128052 A1 * | 9/2002 | Neagley et al. | 455/575 |

(Continued)

FOREIGN PATENT DOCUMENTS

JP   10260251   9/1998

OTHER PUBLICATIONS

Keller, Steven D., et al., "Direct Modulation of an L-bank Microstrip Patch Antenna Using Integrated PIN Diodes," Sep. 20, 2006, 10 pages.

(Continued)

*Primary Examiner* — Jaison Joseph
(74) *Attorney, Agent, or Firm* — Tha Marbury Law Group, PLLC

(57) ABSTRACT

A system and method for arbitrarily switching phase and amplitude at an antenna. A Direct Spatial Antenna Modulation (DSAM) system makes use of the spatial characteristics of a radiating antenna structure to directly alter a signal transmitted or received by the radiating structure. A data stream maps a carrier to different spatial points of excitation in the antenna structure, where each chosen configuration has different radiating characteristics including phase, amplitude, and polarization, which can be used represent data symbols. The spatial points of a radiating structure may be mapped directly to In-Phase and Quadrature components of the output using two spatial feedpoints and amplitude control to the feedpoints. This abstract is not to be considered limiting, since other embodiments may deviate from the features described in this Abstract.

18 Claims, 20 Drawing Sheets

U.S. PATENT DOCUMENTS

| | | | | |
|---|---|---|---|---|
| 2003/0114188 A1* | 6/2003 | Rousu | | 455/553 |
| 2004/0214534 A1* | 10/2004 | Carlson | | 455/121 |
| 2005/0025271 A1 | 2/2005 | Molisch | | |
| 2005/0179614 A1* | 8/2005 | Nagy | | 343/909 |
| 2006/0281423 A1 | 12/2006 | Caimi | | |
| 2007/0222697 A1* | 9/2007 | Caimi et al. | | 343/861 |
| 2007/0286190 A1* | 12/2007 | Denzel et al. | | 370/389 |
| 2008/0111748 A1 | 5/2008 | Dunn | | |
| 2008/0143613 A1* | 6/2008 | Iwai et al. | | 343/702 |
| 2008/0188186 A1 | 8/2008 | Hwang | | |
| 2009/0219137 A1* | 9/2009 | Forster | | 340/10.1 |
| 2012/0019420 A1 | 1/2012 | Caimi | | |

OTHER PUBLICATIONS

Keller, Steven D., "Introduction to Direct Modulation of a Symmetrical Half-Wavelength Patch Antenna Using Integrated Schottky Diodes," Jan. 23, 2006, Prepared for the Duke University Department of Electrical and Computer Engineering Ph.D. Qualifying Exam, 32 pages.

Ma, Guozhong, "Email Template," posted at http://postgrad.eee.bham.ac.uk/mag/Webinfor1.htm, Jun. 12, 2008.

* cited by examiner complex plane

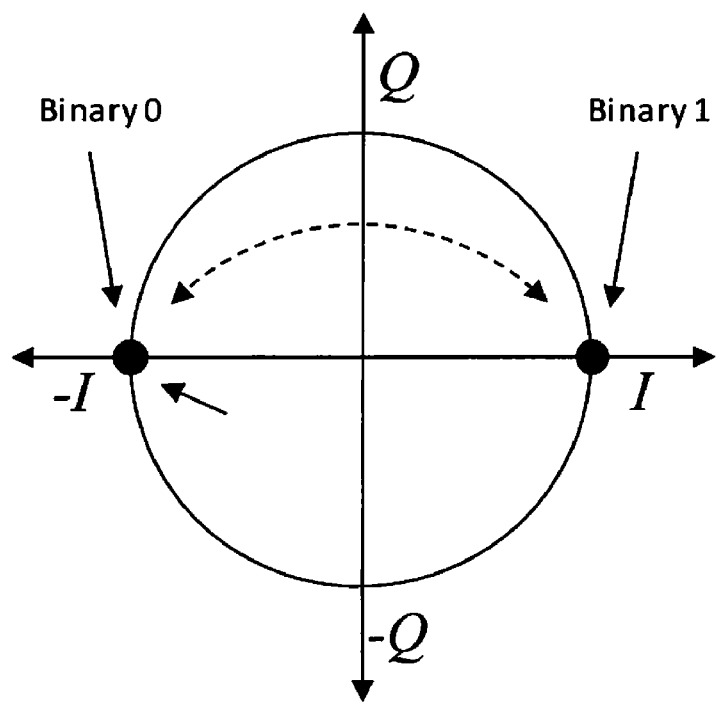
FIG. 3
Prior Art
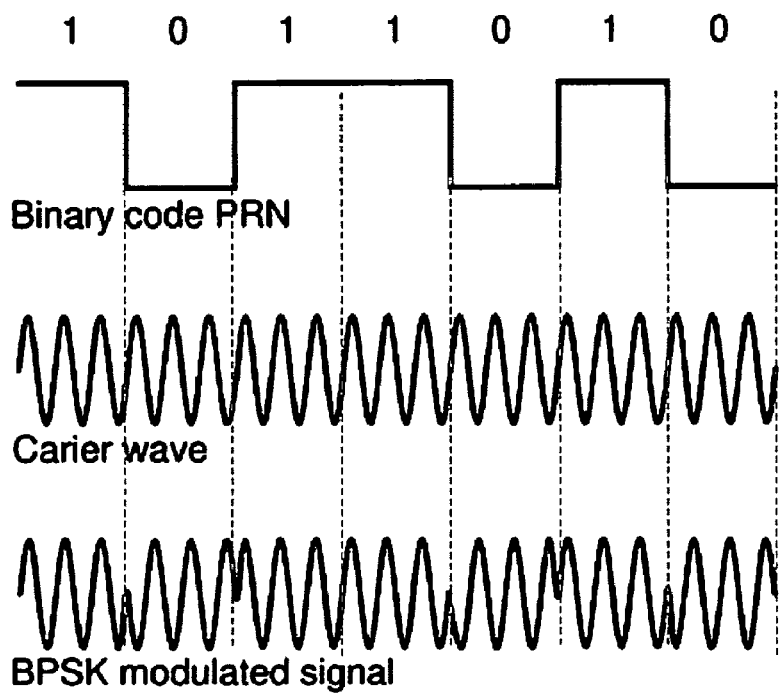

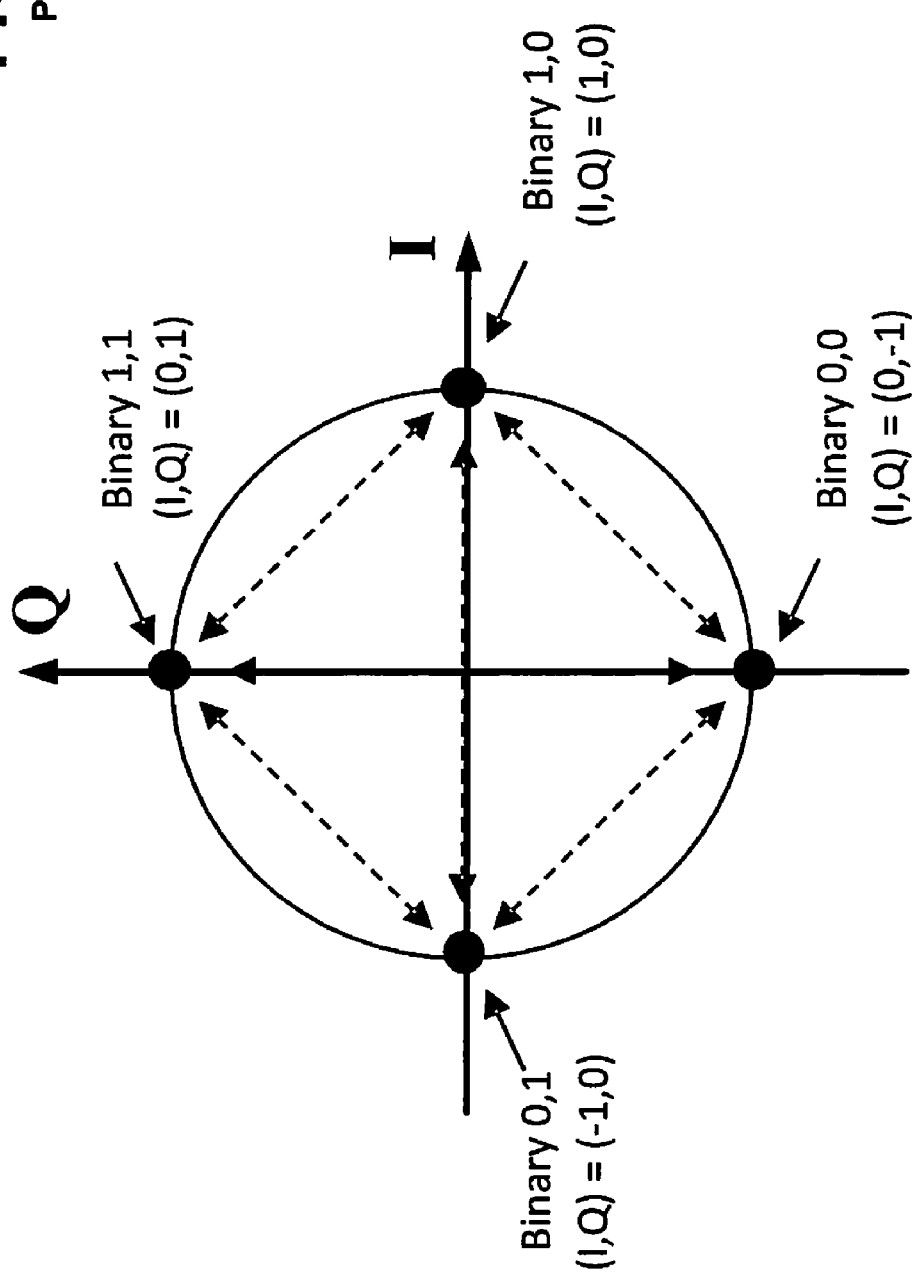

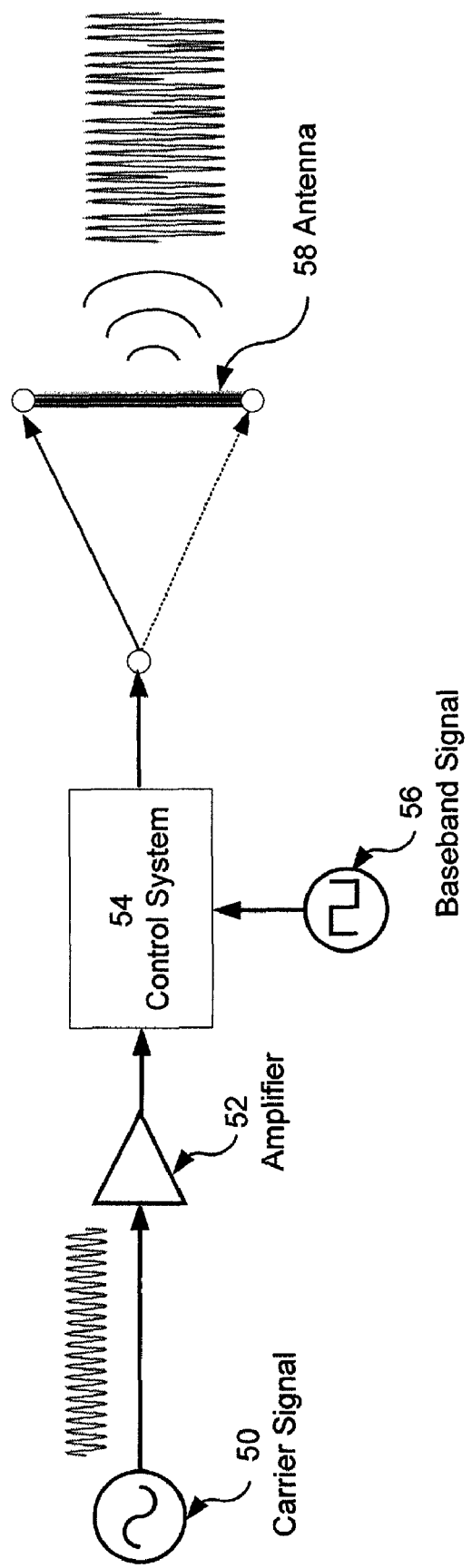

$S = A\cos(2\pi ft)$ $S = A\cos(2\pi ft)$

Complex Plane

≈

IQ DSAM 4-Port Antenna 251.6° phase, 1.58x unit amplitude 1.5 A 0.5 A

S=Acos(2πft)

135° phase, unit amplitude

.707 A 0.707 A $S = A\cos(2\pi ft)$

All three examples produce 90° phase, unit amplitude

Traditional Phased Array
(with variable phase shifters)

IQ DSAM Phased Array
(data and phase shift straight to antennas)

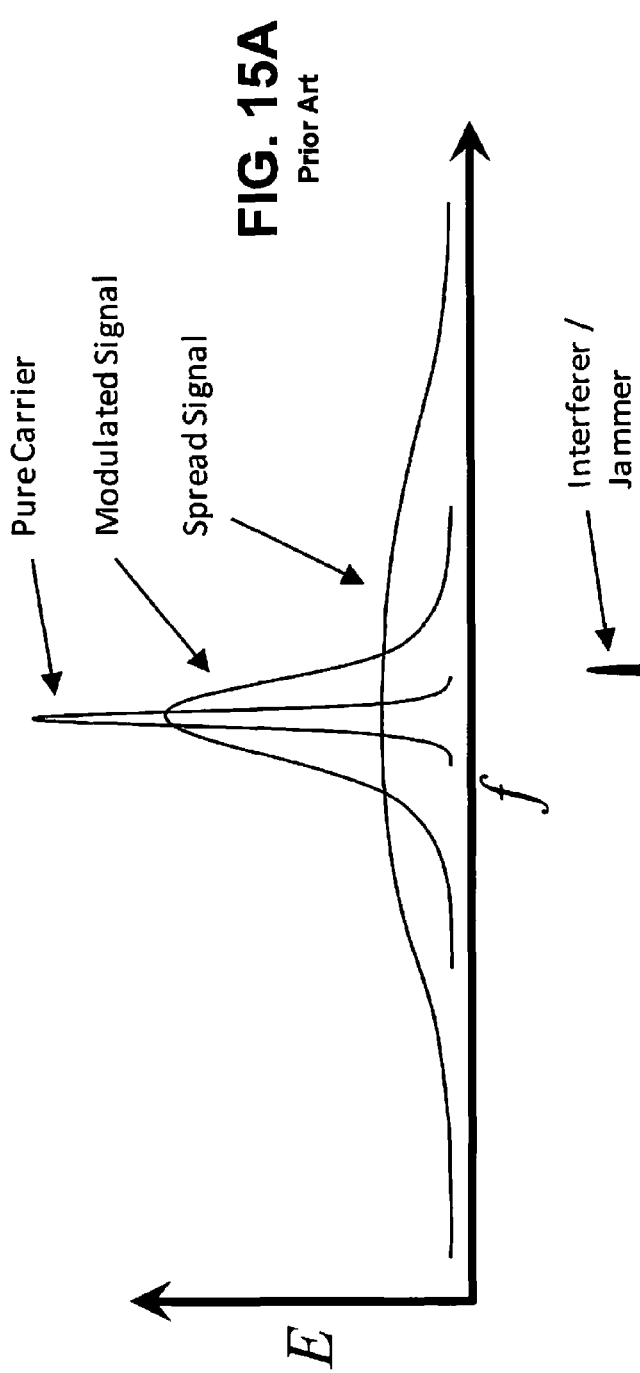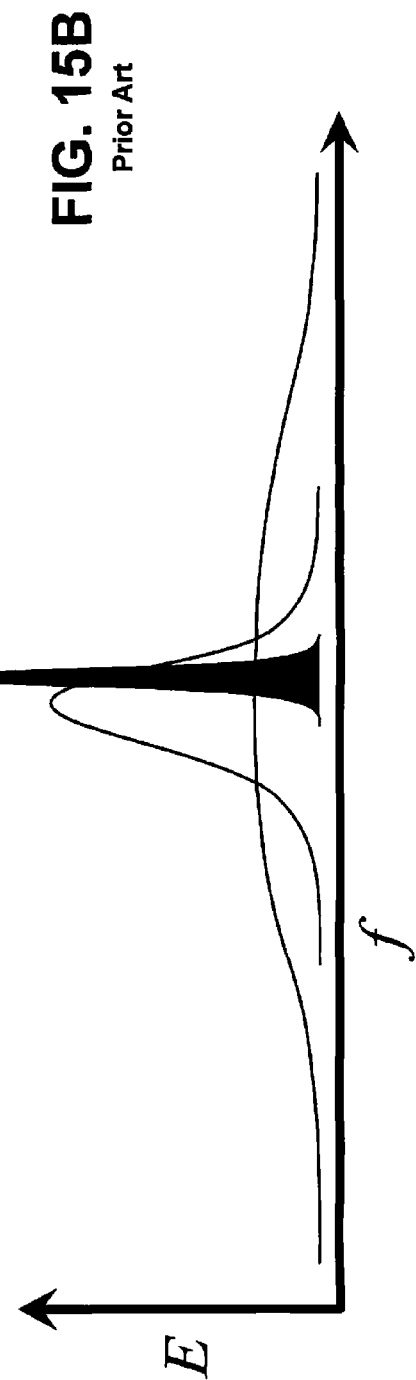

US 8,411,794 B2

SYSTEM AND METHOD FOR ARBITRARY PHASE AND AMPLITUDE MODULATION IN AN ANTENNA

CROSS REFERENCE TO RELATED APPLICATIONS

This application claims the benefit of Provisional Application No. 61/160,803 filed Mar. 17, 2009 and is a continuation in part of U.S. application Ser. No. 12/277,901 filed Nov. 25, 2008. The 61/160,803 application and the Ser. No. 12/277,901 application are incorporated by reference herein, in their entireties, for all purposes.

BACKGROUND

The prevalent paradigm in radio frequency (RF) electronic communications is to treat 1) the RF modulating element and 2) the RF antenna as totally separate and distinct system elements. As such, each is designed and generally defined independently according to "black box" level specifications and connected together in a functionally modular fashion, wherein the baseband data message signal interacts with the RF carrier in the RF modulating element to form a composite signal wholly independent of the characteristics of the RF antenna. The composite modulated RF carrier signal is then provided as a generic input to the RF antenna. This architecture is illustrated in FIG. 1, and represents essentially all existing applications of art.

There are several important aspects of existing approaches to modulation that rely on the architecture illustrated in FIG. 1. First, the modulator stage is a lossy system component, wherein some of the RF carrier signal power is used up in the modulation process. This loss must be overcome through additional re-amplification of the output of the core modulating element, a function that is often, but not always, included internal to the integrated circuit or sub-system comprising the modulator. The amplification needed to overcome the losses associated with existing modulation techniques requires additional system power supply consumption.

Secondly, the existing architecture class of FIG. 1 requires that the final amplification stage process the composite modulated signal directly as it amplifies the composite signal up to the desired transmit power level prior to being fed to the RF antenna. Linearity performance requirements are thereby imposed on the power amplification stage such that a failure to meet the linearity requirements will result in an inability to achieve some desired level of transmit modulation accuracy and thus to some desired level of wireless communications link performance. It is a common requirement that amplifiers used to transmit high-order amplitude and phase modulated signals be "backed off" from their maximum operating output level in order to meet transmit signal distortion requirements, further reducing the maximum output power available to existing systems.

FIG. 2A is a graphical illustration of an RF signal. A pure unmodulated RF signal is a sinusoidal electromagnetic wave that oscillates at a fixed frequency (f) over time (t) with a particular amplitude (A) and phase ($\phi$). The phase is a property that indicates where in its oscillating cycle a signal will be at any given time and space (up, down, or in between). An unmodulated signal oscillates over time, but the phase of the signal is fixed.

Phase is measured in radian (or degrees) with respect to a reference signal. At 0 (0°), a signal overlaps a reference signal; at $\pi$ (180°) a signal is opposite to a reference signal; at $2\pi$ (360°) they overlap again. Since a signal of fixed frequency can be defined by phase and amplitude alone, it is easy to represent as a fixed point on a circle, where the radius of the circle is the amplitude A and the angle to the point is the phase $\phi$. FIG. 2B is a graphical illustration of the RF signals of FIG. 2A mapped to a circle. This circle lies on what is called the "complex plane."

Any point in the complex plane, and hence any signal of arbitrary phase and amplitude, has sine and cosine components:

$$A \cos(2\pi ft + \phi) = A \cos(\phi)\cos(2\pi ft) - A \sin(\phi)\sin(2\pi ft) \qquad [1]$$

where $A \cos(2\pi ft + \phi)$ is a signal of arbitrary amplitude A and phase $\phi$, $A \cos(\phi)$ is the amplitude of the cosine component of the arbitrary signal, and $A \sin(\phi)$ is the amplitude of the −sine component of the arbitrary signal.

These components may be represented as projections onto the x and y axis of the complex plane. In this representation, the x axis is the cosine component (sometime referred to as the "in-phase" component or "I") and the y axis is the −sine component (sometime referred to as the "quadrature" component, or "Q"). Because the choice of time 0 is arbitrary, I and Q are used rather than cosine and −sine. Thus, I refers to a signal that is "in-phase" with a reference signal, and Q refers to a signal that is out of phase by 90° or "quadrature" with a reference signal.

A primary objective of RF communications is to communicate information. Information is imparted to radio waves by altering aspects of the waves over time. Data may be represented by altering a carrier's phase, amplitude, frequency and/or polarization.

In digital wireless communication, bits are transmitted as binary information: 1s and 0s. For example, by switching (modulating) a carrier wave back and forth between two opposite (180° apart) phase states, the 1 and 0 "bits" of information may be communicated one bit at a time. This switching occurs at a modulation frequency (for example, 1 million modulations per second), and each modulation segment over time is referred to as a symbol. This particular modulation is called Binary Phase Shift Keying (BPSK), and it transmits 1 bit per symbol. FIG. 3 is a graphical illustration of BPSK modulation.

Modulation is not limited to two states. For example, switching between four different states permits transmission of two bits per symbol. FIG. 4A is a graphical illustration of Quadrature Phase Shift Keying (QPSK) modulation. QPSK switches between four points on the complex plane. The complex plane may be divided into many different states to transmit more information per symbol, generally by varying phase or amplitude Radio waves not only have amplitude and phase, they also have a direction and a polarization. The type of polarization used in a radio system depends on the application requirements. In the context of an electromagnetic radiator, polarization is defined as the instantaneous vector direction of the electric field of the propagating wave from the perspective of the transmit antenna. There are basically three types of polarization, linear, circular, and elliptical, illustrated in FIG. 4B. Linear and circular polarization may be viewed as special cases of elliptical polarization. In linear polarization, the electromagnetic wave propagating outward from the transmitting antenna exists (and varies in amplitude as a cosinusoid) along a single vector direction. For an elliptically polarized wave, the electric field vector rotates around the axis of propagation as a function of time, tracing out an ellipse as seen from behind. When both orthogonal components of an elliptical wave have the same peak amplitude, then the polarization is said to be circular. Circular and elliptical polarization may be right handed or left handed.

There is a class of technologies that utilize antennas to modulate a carrier are sometimes described as using "direct antenna modulation" techniques. These methods tend to focus on amplitude modulation only, and do not leverage the spatial aspects of the antennas. Other current research efforts that use the term "antenna modulation" do not encode information symbols on a transmitted signal, but are rather attempts to achieve an increase in the equivalent instantaneous impedance bandwidth of an antenna, which is otherwise used in a traditional fashion. While these other methods do modulate the antenna structure, the implications and benefits of employing the spatial aspects of antenna modulation are neither addressed nor realized.

SUMMARY

Embodiments herein are directed to fixed and arbitrary modulation, beam steering, spreading, and despreading schemes that are enabled by leveraging the spatial aspects of an antenna.

In one embodiment, the modulation of a signal is achieved by switching an RF feed to different spatial points in a radiating antenna structure. In this embodiment, when the signal is fed to each feed point (or set of feed points) the radiated signal will have a single far field phase, amplitude, and polarization characteristic, whereby switching between different sets of feedpoints modulates the input signal in these characteristics.

In another embodiment, de-modulation of spread signals may be achieved in receive mode by switching between appropriate sets of spatial feedpoints in the receiving structure when the modulation sequence is known. This is a process called de-spreading.

In another embodiment, the phase and amplitude of an RF feed is controlled arbitrarily by varying the feed point and the amplitude of the RF feed to a symmetric radiating structure. In another embodiment, RF feeds may also be subjected to fixed phase shifts when fed to each feed point. In these embodiments, the ports can correspond directly to the I and Q channels and the manner in which they are fed will determine the resulting transmitted amplitude, phase, and polarization.

DESCRIPTION OF THE DRAWINGS

FIG. 3 is a graphical illustration of BPSK modulation.

FIG. 4A is a graphical illustration of Quadrature Phase Shift Keying (QPSK) modulation.

FIG. 5 is a block diagram illustrating the logical components of a modulation scheme according to an embodiment hereof.

FIGS. 15A and 15B are graphical representations illustrating concepts of signal spreading as known in the art.

DETAILED DESCRIPTION

Figure 1:
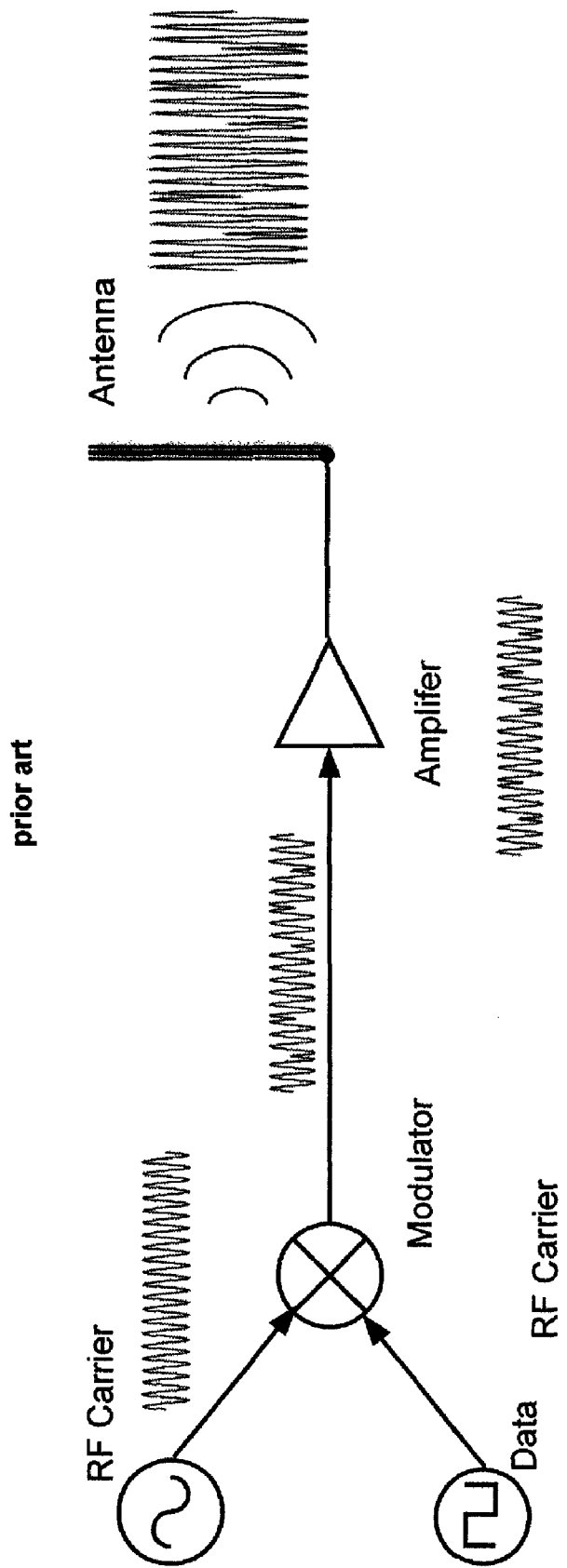
FIG. 1 is a block diagram illustrating the logical components of a modulation scheme as known in the prior art.
Figure 2A:
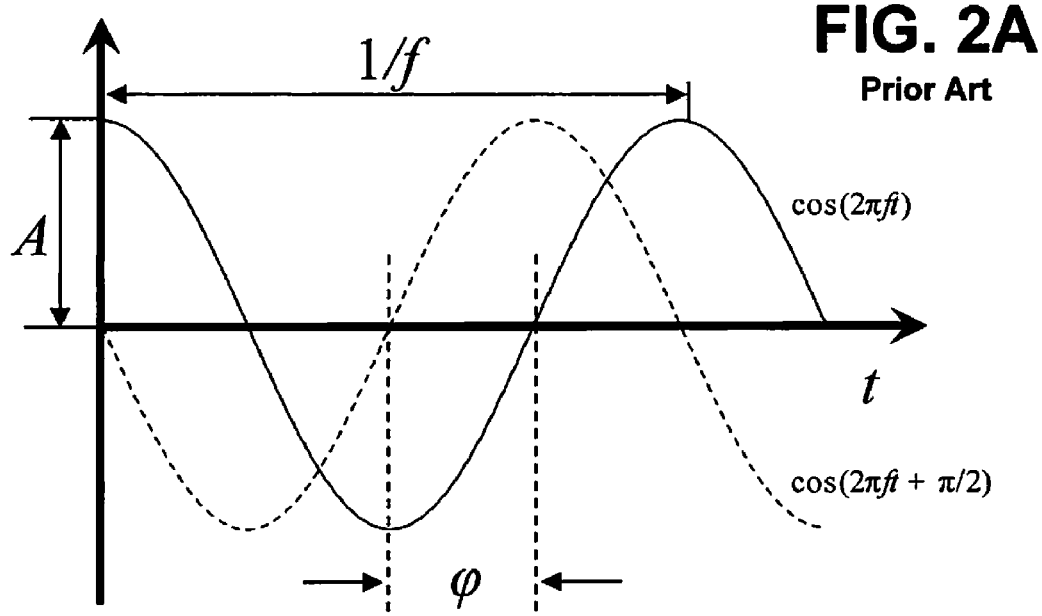
FIG. 2A is a graphical illustration of an RF signal.
Figure 2B:
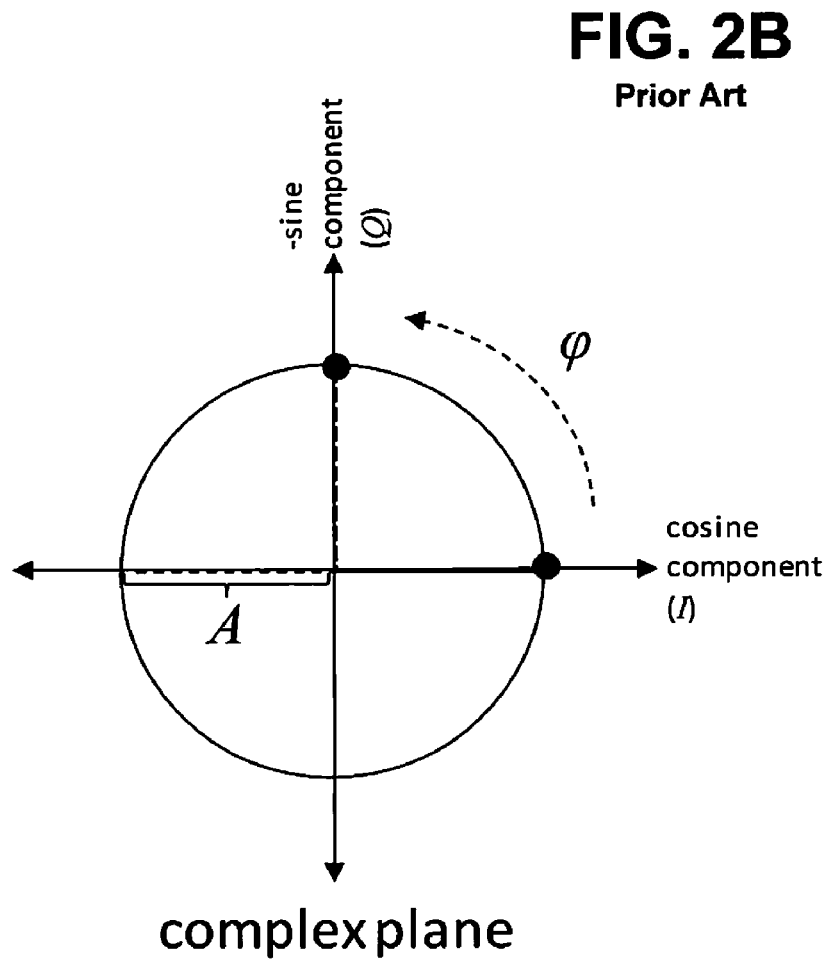
FIG. 2B is a graphical illustration of the RF signals of FIG. 2A mapped to a circle.

With Direct Spatial Antenna Modulation (DSAM), the typically distinct RF modulator and RF antenna functions are combined into a DSAM antenna structure defined through adherence to a specific conceptual rubric, to be described. The net result of this combination is that the modulation functionality is moved into the antenna structure itself, eliminating the typical modulation stage in existing approaches.

Introduction to DSAM

DSAM makes use of the spatial aspects of the antenna response itself, ignoring the method of typical modulation. In DSAM, each symbol is mapped directly to the electromagnetic field produced by the antenna structure itself by way of controlling where the excitation is present in each $n^{th}$ information symbol period. The location or locations on the antenna structure may be referred to as "spatial points of excitation" or "feedpoints."

To modulate a carrier, a DSAM antenna switches a carrier feed to different spatial points of excitation in a DSAM antenna structure, where each point (or collection of points) has a particular far-field propagation characteristic. The number of symbol states, or bits, transmitted per modulating cycle is in the simplest cases related to the number of feedpoint configurations available. The symbol rate is determined by the switching rate of the DSAM control circuitry.

FIG. 5 is a block diagram illustrating the logical components of a DSAM modulation scheme according to an embodiment hereof. In this embodiment, modulation is performed by switching a carrier feed between different spatial feedpoints in an antenna structure. As illustrated, a carrier signal 50 is fed to an amplifier 52. The amplified carrier signal is received by a control system 54. A baseband signal 56 is also received by the control system 54. In response to the baseband signal 56, the control system 54 switches the carrier signal to different ports of an antenna 58. While the antenna 58 is illustrated as a monopole antenna, this is not meant as a limitation. More complex switching and antenna structures are described in detail below.

As illustrated in FIG. 5, the pre-PA lossy modulator structure required in existing approaches (see, FIG. 5) has been eliminated in the DSAM architecture. Not only does the DSAM architecture overcome the system power losses associated with the typical modulator stage, but it potentially offers a lower-cost and reduced-size implementation of the same functionality. By moving the composite modulated signal to after the final PA stage, the PA need only process the bare RF carrier signal itself for which there are drastically reduced linearity requirements relative to the composite modulated signal. Reduced linearity requirements allow for increased transmit power with a given amplifier device or possible utilization of a less expensive, less power consumptive, and physically smaller alternate power amplifier.

In DSAM, message signal modulation is performed as a primary activity in a composite antenna implementation through direct manipulation of the instantaneous state of the polarization of the radiating structure electromagnetic excitation. As such, the composite modulated waveform signal does not necessarily appear as a discrete entity within the antenna structure itself. The bare, unmodulated RF carrier excites the resonant nature of the electromagnetic structure while the baseband data message signal directly controls the instantaneous spatial point or points of excitation of the RF carrier within the structure. As such, the DSAM concept can be described as a "spatio-temporal" modulation technique since it breaks away from existing time-only modulation techniques to utilize direct spatial excitation control. In an embodiment, the RF carrier excitation is of a totally continuous wave (CW) nature. However, this is not meant as a limitation. As will be described below, a modulated carrier may also be applied to a radiating structure using DSAM techniques.

Figure 6B:
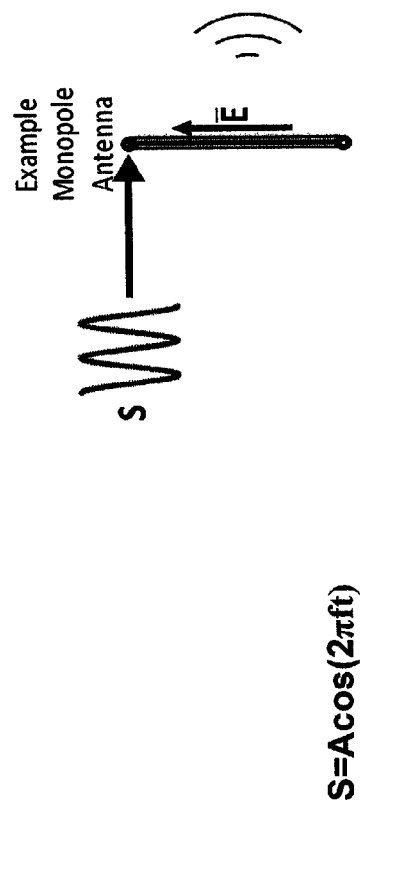
FIGS. 6A and 6B are graphical illustrations of a process for changing the phase of a signal according to an embodiment.
Figure 6A:
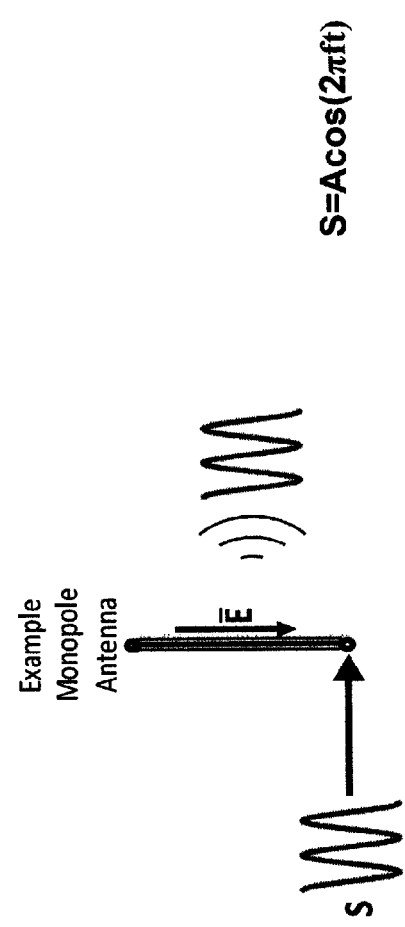

Phase relationships in DSAM may also be conveniently illustrated using a monopole antenna. Again, the discussion of a monopole antenna is illustrative and not meant to be limiting. FIGS. 6A and 6B are graphical illustrations of a process for changing the phase of a signal according to an embodiment. FIGS. 6A and 6B illustrate a waveform "S" being applied to ends of a monopole antenna. For discussion purposes, S=A cos(2πft), where A is a unit of amplitude. When the applied RF voltage is applied to a bottom feedpoint or "port" on the antenna (FIG. 6A) in an increasing part of a wave, an electric field is produced that drives a current in the upward direction. When the applied RF voltage is applied to this port in a decreasing part of a wave, then the current is driven downward. As illustrated in FIG. 6B, when the RF waveform is fed from the other side of the monopole antenna (the other port), the same voltage waveform drives currents in the antenna in a reversed direction, thereby shifting the phase. If designed correctly, these feeds will radiate electromagnetic waves that are 180° out of phase. Therefore, using such a radiating structure, a BPSK modulated signal can be generated by simply switching a carrier between the two ports. This property defies general intuitive assumption that the radiated waveform is the same regardless of where in an antenna the RF feed is applied.

Introduction to IQ DSAM

Figure 7C:
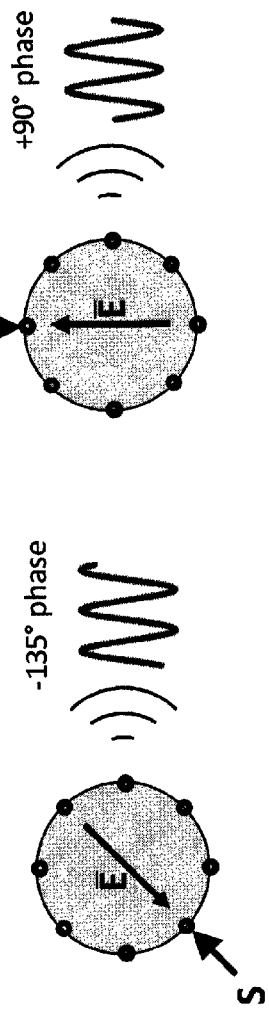
FIGS. 7A, 7B and 7C are graphical illustrations of a process for changing the phase of a signal using a multi-port circular patch antenna according to an embodiment.
Figure 7B:
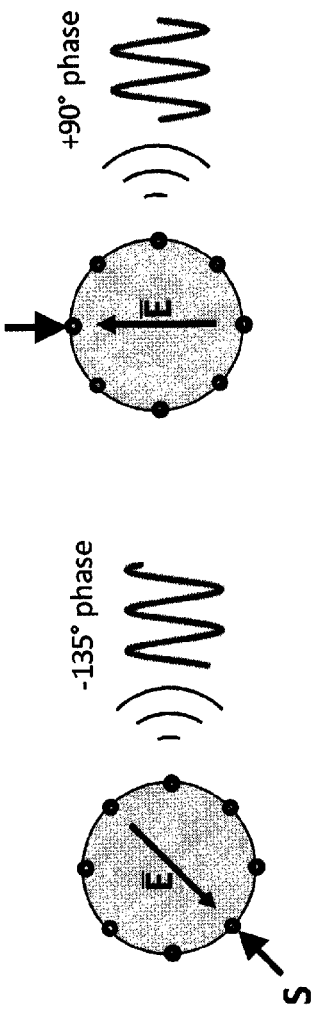
Figure 7A:
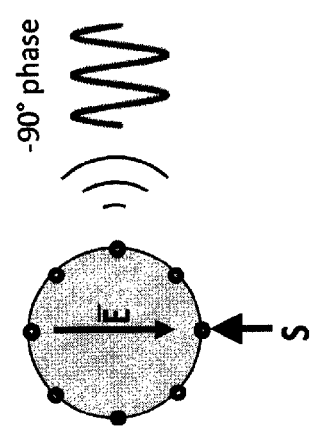

FIGS. 7A, 7B and 7C are graphical illustrations of a process for changing the phase of a signal using a multi-port circular microstrip patch (CMSP) antenna according to an embodiment. By way of illustration and not by way of limitation, a CMSP antenna may be driven from a single port. In this mode, the CMSP antenna will behave in a similar fashion to a monopole. However, with the symmetric design, additional ports may placed along the circumference of the antenna such that the phase of a radiated signal may be varied by any number of degrees. That is, the number of radiated waveform phase states may be arbitrarily determined by the number of ports along the circumference. This pure DSAM embodiment, pure in the sense that a carrier feed is fed directly to a selection of antenna ports, is well suited to waveforms with fixed symbol states.

Figure 8B:
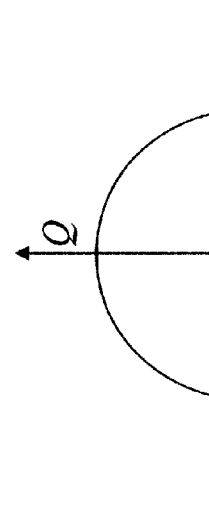
FIGS. 8A and 8B are graphical illustrations of a mapping of ports of a circular patch antenna to I and Q components represented on a complex plane according to an embodiment.
Figure 8A:
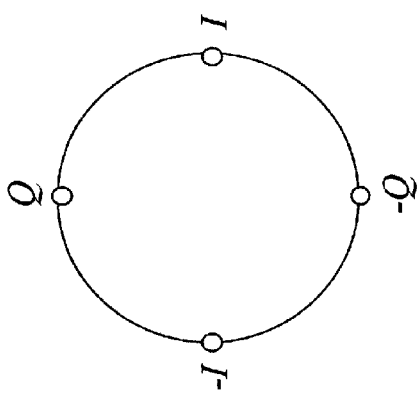

FIGS. 8A and 8B are graphical illustrations of a mapping of ports on a CMSP antenna to I and Q components represented on a complex plane according to an embodiment. In this embodiment, a CMSP antenna (see FIG. 8A) comprises four ports: I, Q, −I, and −Q, which correspond to phase shifts of 0 (0°), π/2 (90°), π (180°), and 3π/2 (270°). Therefore, these ports map directly to I and Q components of the radiated signal as represented on a complex plane (see FIG. 8B). This DSAM approach is sometimes referred to as IQ DSAM.

In an embodiment, a CMSP IQ DSAM antenna supports switching between arbitrary values of phase and amplitude. By way of illustration and not as a limitation, an IQ DSAM antenna with four ports in conjunction with additional amplitude control of the signal to each feed point can support this capability. By way of illustration and not as a limitation, an IQ DSAM antenna with two ports (+I and +Q alone) in conjunction with amplitude control and the ability to invert the feed signal to each feed point can also support this capability. This is because for the circular patch and similar symmetric structures (e.g. square patches, quadrifilar helices, etc), the two or four evenly spaced feeds are tied directly to the I and Q values of the radiated waveform. In other words, just as an arbitrary signal can be divided into different values of I and Q, by being able to control I and Q directly one can generate an arbitrary signal.

Figure 9B:
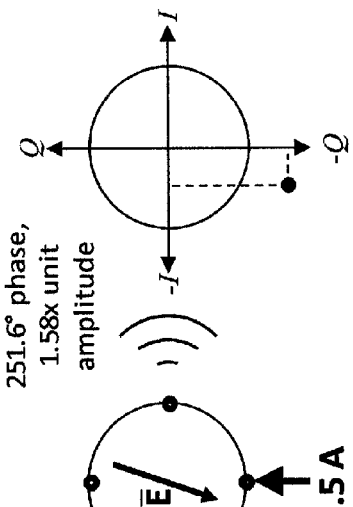
FIGS. 9A and 9B are graphical illustrations of arbitrary phase and amplitude control capabilities of an IQ DSAM antenna according to an embodiment.
Figure 9A:
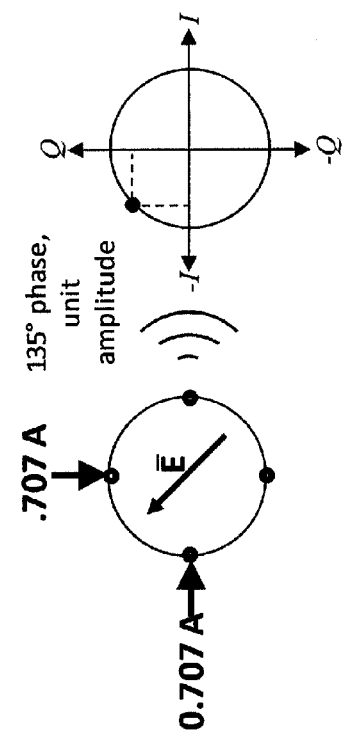

FIGS. 9A and 9B are graphical illustrations of arbitrary phase and amplitude control capabilities of an IQ DSAM antenna according to an embodiment. In these figures, a waveform "S" is applied to ports of a CMSP antenna. For discussion purposes, S=A cos(2πft), where A is unit of amplitude. As illustrated in FIG. 9A, a signal with amplitude A/sqrt (2) (where A is an arbitrary amplitude) is applied at ports −I and +Q. The signal generates a radiated waveform with amplitude 1 A and a phase of 135°. As illustrated in FIG. 9B, a signal having an amplitude 0.5 A is applied at ports −I and a signal having an amplitude of 1.5 A is applied to port −Q. This signal configuration generates a radiated waveform with amplitude 1.58 and a phase of 251.6°.

IQ DSAM and Polarization

The CMSP DSAM and IQ DSAM examples so far produce linearly polarized radiation since the ports are driven with carrier feeds of the same phase. This is because when ports are driven at the same phase, currents are stimulated to oscillate back and forth along a line, and the radiated electric field is polarized along the direction of the currents. The orientation of the polarization depends on the feedpoints used. Therefore, in the linear polarized embodiment described, the polarization naturally varies with the phase.

FIGS. 10A, 10B, 10C and 10D are graphical illustrations of a process for changing the axial polarization of a radiated a symbol using a multi-port circular patch antenna according to an embodiment. In these figures, a waveform "S" is applied to ports of a CMSP antenna. For discussion purposes, S=A cos(2πft), where A is unit of amplitude. To produce circular polarization, a 90 degree phase shifted carrier may be fed to points to stimulate the circular modes. To do this, pairs of quadrature excitation are used. This is illustrated in the diagram below for desired symbol [Q=1,I=0], with configurations for right hand circular polarization, linear polarization, and left-hand circular polarization (looking left to right).

Figure 10C:
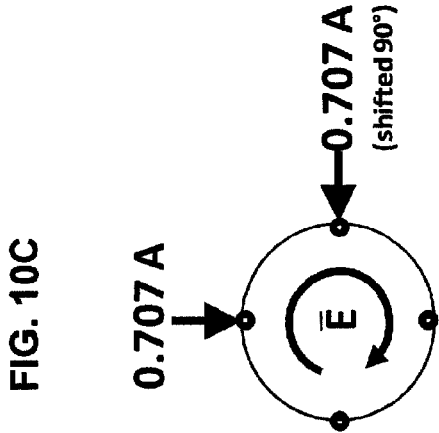
FIGS. 10A, 10B, 10C and 10D are graphical illustrations of a process for changing the axial polarization a signal using a multi-port circular patch antenna according to an embodiment.
Figure 10B:
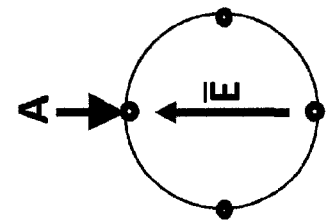
Figure 10A:
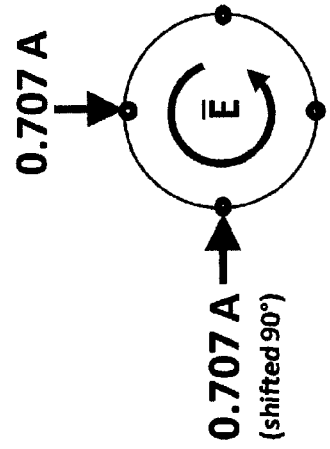
Figure 10D:
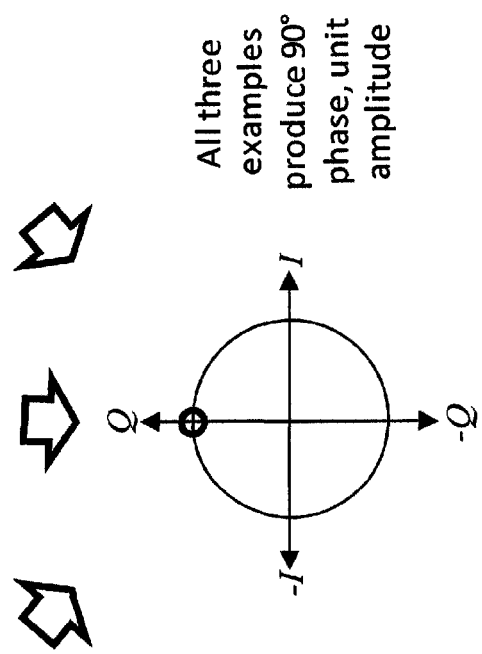

If, for example, an RF carrier of amplitude A/sqrt(2) is fed to the +Q port, and the −I port is fed the carrier of amplitude A/sqrt(2) shifted by 90°, then the resulting waveform is left-hand circular polarized with 0° phase and amplitude of A (see, FIGS. 10A and D). If the +Q port is fed an RF carrier of amplitude A, then the resulting waveform is linearly polarized with 0° phase and amplitude of A (see, FIGS. 10B and D). If an RF carrier of amplitude A/sqrt(2) is fed to the +Q port, and the +I port is fed the carrier of amplitude A/sqrt(2) phase shifted by 90°, then the resulting waveform is right-hand circular polarized with 0° phase and amplitude of A (see, FIGS. 10C and D). Elliptically polarized waveforms may be generated by using a different phase shift on the secondary ports.

DSAM Receiver and DSAM Frequency Conversion

In an embodiment, a DSAM antenna may be used as a receiver, where the RF output of the antenna is connected to a set of spatial points on the antenna determined by a control system. Each configuration of spatial points chosen by the control system will effectively adjust the received signal by a particular phase.

As an example embodiment and not a limitation, the monopole DSAM antenna of FIG. 5 can output two representations of the received signal, one of which is 180° out of phase with the other. If a received signal is a coded linearly polarized BPSK modulated tone, for example, a design such as this could cancel the modulation and output a pure tone by applying the same coded sequence in reverse.

In a more general sense, as an example embodiment and not as a limitation, an IQ DSAM can shift a received signal by arbitrary values of phase and attenuation. Such a device could apply subtle phase shifts on a received signal.

In an embodiment, if the control system can actively and dynamically control the I and Q shifts of an IQ DSAM antenna and move the I and Q values around unit circle in the complex plane constantly as a function of time, then the frequency of the received signal can be shifted in the antenna. This frequency conversion can be applied in receive mode, where the received signal is shifted in frequency, as well as transmit mode, where the transmitted signal is shifted in frequency.

DSAM Applied to a Microstrip Patch Antenna

Figure 11:
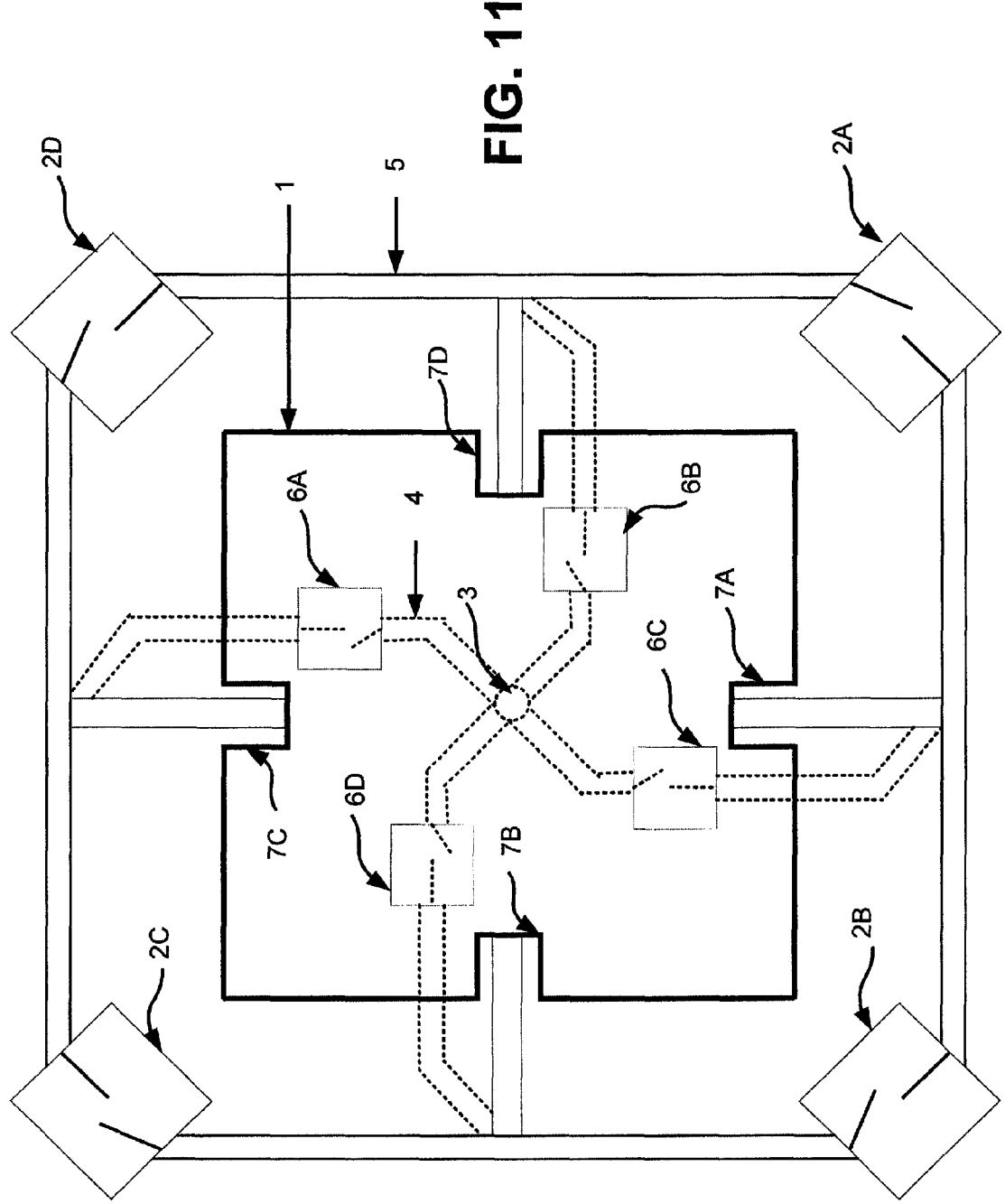
FIG. 11 is a block diagram illustrating a modulated antenna structure implemented according to an embodiment.

FIG. 11 illustrates a block diagram of a modulated antenna structure implemented according to an embodiment. The embodiment illustrated in FIG. 11 comprises a microstrip patch antenna structure (1), a radio-frequency switch system comprising switching elements 2A, 2B, 2C, 2D and 6A, 6B, 6C and 6D, a common feed point location (3), multiple bottom layer printed circuit transmission line sections (4), and multiple top layer printed circuit transmission line sections (5). In this embodiment, the microstrip patch antenna structure (1) is a square layer of copper of dimensions appropriate to the operating frequency and printed circuit board substrate material. However, this is not meant as a limitation. Other materials of appropriate size and shape may be used to perform the functions of the microstrip patch antenna. For example, a suitable alternative radiating element to the microstrip patch would be a quadrifilar helix, a waveguide horn, a crossed dipole, a quadri-filar helix, a dual-arm sinuous antenna. The choice of antenna structure in a typical application would be based on the overall requirements of the application, such as radiation pattern coverage, available physical volume, and so on. While FIG. 11 illustrates an antenna structure with four feed ports, this is not meant as a limitation.

The microstrip patch antenna structure (1), along with all top-layer switching elements (2A-2D) and transmission lines (5), sit above a metalized ground layer, separated by a dielectric circuit board material, as required for their proper operation. The bottom layer transmission lines (4) and switching elements (6A-6D) sit below the same metalized ground layer, separated by the same dielectric circuit board material layer. The specific dielectric used, dielectric and metallization thicknesses and similar typical design details are not critical in principle to the operation of the illustrated embodiment.

In an embodiment, the lengths of the top and bottom layer transmission line segments and the placement of the switch elements in FIG. 11 are configured so as to provide an odd multiple of ¼ guided wavelength over the desired operating band of the device with respect to the common feed location (3), driven antenna ports, and adjacent switch device locations. As such, the opening of a switching element 2A-2D presents a closed circuit to the carrier signal and the closing of a switching element presents an open circuit respectively circuit to the carrier signal. Similar, the opening and closing of one the switching elements 6A-6D presents open and closed circuits respectively to the carrier signal. Additionally, by constraining the paths to switching elements 6A-6D to an odd multiple of a ¼ wavelength of the carrier signal, paths may be constructed using the switching elements that facilitate circularly polarized modulation.

The means to achieve the phase shift of the carrier arriving at the antenna ports can be implemented in a wide variety of ways. All typical options for achieving a phase shift of the bare carrier would be suitable, such as a passive microwave hybrid device or an active circuit such as a loaded line, so long as the phase shift is used solely as a means to properly excite spatially separated antenna ports as opposed to being the point of modulation in and of themselves. While FIG. 11 illustrates the use of switching elements to feed the ports of the antenna structure from a common feed port, other embodiments may provide signals directly to the ports to access the desired points of excitation.

As illustrated in FIG. 11, in this embodiment the radio frequency carrier alone serves as the excitation of the antenna structure. The baseband data symbol signals serve only to control the time-space excitation of the antenna structure by the continuous wave carrier.

By way of illustration and not as a limitation, an unmodulated carrier is presented in all cases to common feed location 3. If dual-linear polarized quadrature phase shift keying (QPSK) modulation is desired, then all switches would remain open during operation of the embodiment except for any one at a given time of the set: {6A, 6B, 6C, and 6D}. This set of closed switch positions produces one of four distinct spatial modulation responses corresponding to four distinct data symbol states.

Alternately, for the case of a single-sense circular-polarization with the same QPSK format, paired sets of closed switch settings are required for each of the four symbol states. The switch sets in this case would be: {(6A, 2C), (6D, 2B), (6C, 2A), (6B, 2D)}, in which case right-hand-circular polarization would result. If instead left-hand circular polarization was desired, then a different set of four switch combinations would be required: {(6A, 2D), (6D, 2C), (6C, 2B), (6B, 2A)}.

The right-hand and left-hand symbol states can be combined to produce a new modulation format: dual-circular-polarized (DCP) QPSK DSAM which has a total of eight symbol states. In DCP-DSAM, an additional information bit is mapped to the circular polarization state of the already-polarized modulated DSAM signal, thereby achieving a 50% data rate increase within the same occupied spectral channel. The uncorrelated nature of the relative circular sense of the transmitted wave relative to the instantaneous absolute carrier phase value is such that the error rate of the DCP-DSAM format scales with this new bit, resulting in the same net per-bit error rate.

The maximum data switching rate of a DSAM structure is related to the maximum transition rate of the switching element and to the dynamics of the electromagnetic radiating structure (antenna) itself, whichever is more influential. The support dynamics of the antenna are determined by the specific antenna structure chosen from among all possible DSAM-capable designs and in general will be the least dominant relative to the actual switching mechanism itself since the antenna already supports operation at the radio frequency (RF) carrier signal, which will typically be faster than the data symbol rate.

In an embodiment, the data symbol switching is performed by a PIN RF diode. PIN diode forward-bias (turn on) and reverse bias (turn off) times are different. The forward bias of a PIN diode happens very quickly, with only a minor degree of dependence on bias current. Typical values are in the 2-10 ns range. Once forward-biased, achieving a reverse-bias state is a more complicated function of device characteristics and forward bias current conditions. With sufficient reverse bias, however, these times can be made very nearly equal, yielding a switching rate on the order of 500 MHz. By way of example and not as a limitation, at 3 bits per symbol, as is the case in DCP–QPSK DSAM, a bit rate of 1.5 Gbps may be achievable.

Mapping of baseband data symbols to the antenna space-time structure excitation results in the ability to implement full phase control over the transmitted wave time state, with wave state polarization capabilities as an additional aspect of control. This level of control allows for the implementation of the DCP-DSAM modulation format using circular polarization sense as an additional orthogonal bit state on top of the already optimal QPSK format afforded by the use of four spatial feed points as previously described.

Different transmit polarization states produce different responses at the receiver, and indeed this is the basis for the highly-efficient DCP-DSAM modulation format that uses both RHCP and LHCP states to add an extra bit per symbol to the data stream relative to fixed-polarization QPSK.

DSAM itself is not limited to producing only the QPSK modulation format. Rather, a wide variety of modulation formats, some not otherwise achievable using the existing techniques can be produced by DSAM.

The embodiment illustrated in FIG. 11 represents but one of an entire family of possible instantiations of an antenna design based on the DSAM approach. There are many ways to implement DSAM-based antenna structure and any particular implementation will reflect a balancing of secondary considerations such as size, cost, application, and the minutiae of electronic performance criteria known to one of ordinary skill in the art. In one embodiment, for example, a DSAM-based antenna structure takes advantage of higher-order spatial excitation. In another embodiment, DSAM-based antenna structure includes additional spatial antenna port excitation points with non-equal coupling or excitation efficiencies allowing for jointly implemented space-time-amplitude symbol mapping. In yet another embodiment, a DSAM-based antenna structure supports QPSK modulation in a compatible fashion with existing QPSK waveforms while taking advantage of the DSAM benefits of reduced cost and complexity. In another example, a quadrifilar helix-based structure could support omni-directional DCP-DSAM waveforms.

IQ DSAM Applied to a Multi-Port Circular Microstrip Patch Antenna

Figure 17:
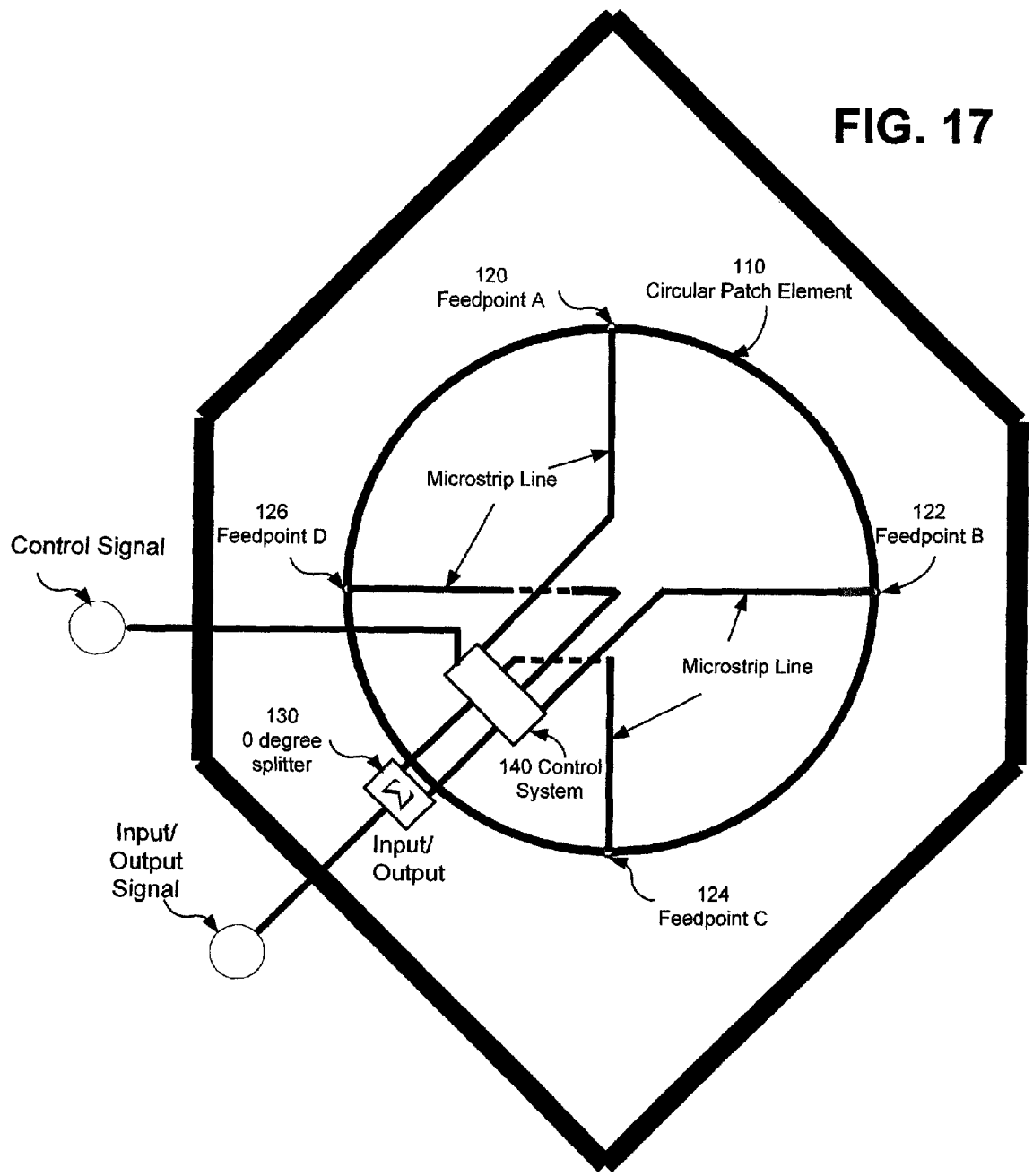
FIG. 17 is a block diagram illustrating CMSP antenna configured to provide linear polarization according to an embodiment.

FIG. 17 is a block diagram illustrating CMSP antenna configured to provide linear polarization according to an embodiment. A circular patch element 110 comprises feedpoints A, B, C and D (120, 122, 124, and 126 respectively). An input signal is applied to input/output 110 and split by zero degree splitter 130. The split signal is fed to a control system 140 that is responsive to a control signal. One branch of the split signal may be directed to feedpoints A or C (120 and 124) and the other branch of the split signal may be directed to feedpoints B and D (122 and 126).

Figure 18:
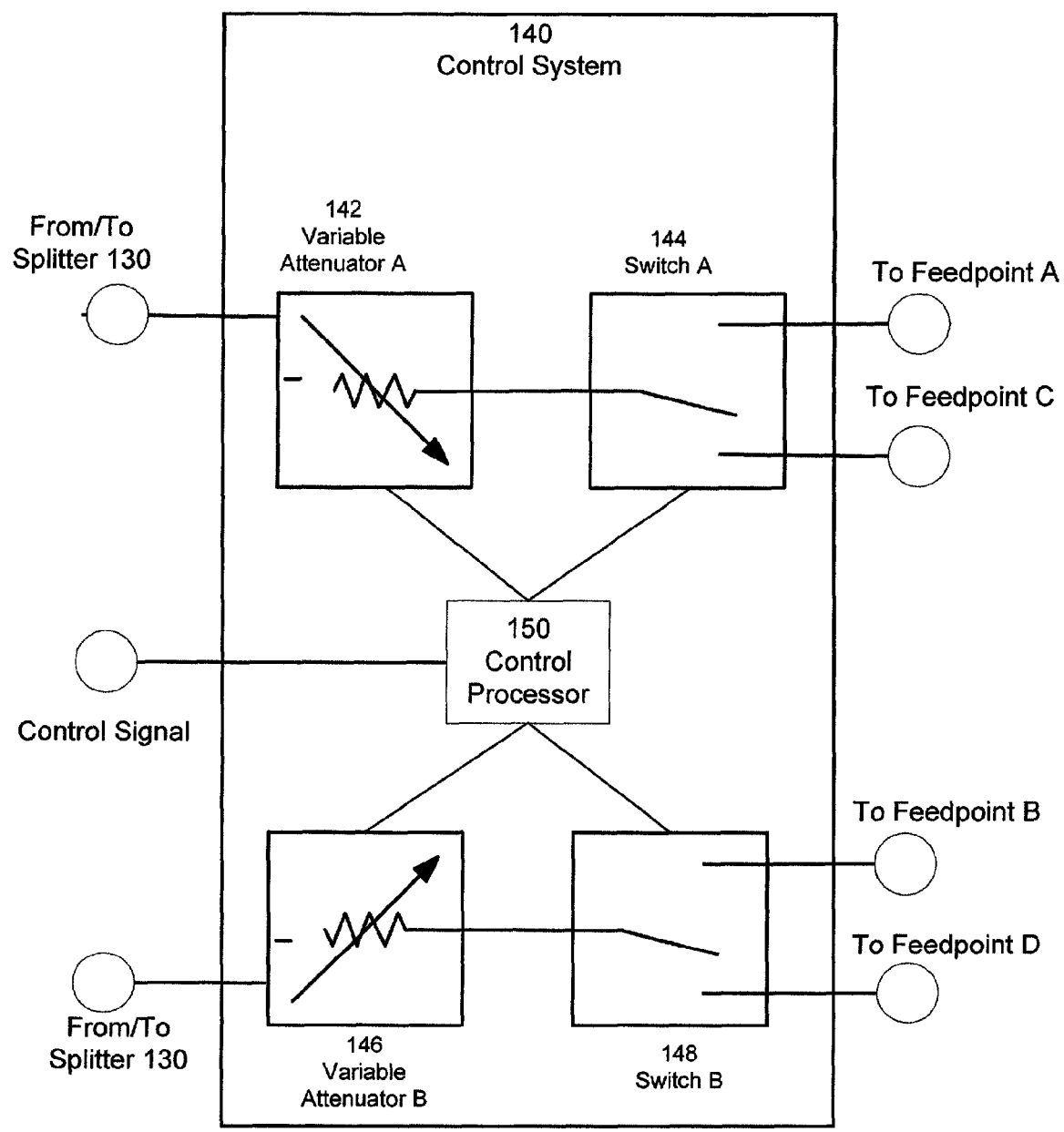
FIG. 18 is a block diagram illustrating a controller according to an embodiment.

FIG. 18 is a block diagram illustrating a controller according to an embodiment. A controller 140 comprises variable attenuator A 142 and switch A 144 and variable attenuator B 146 and switch B 148. The variable attenuators A and B (142 and 146) and the switches A and B (144 and 148) are controlled by a control processor 150 that is responsive to a control signal. In an embodiment, the input signal is an unmodulated carrier signal and the control signal is a baseband signal.

In the embodiment, the position of switches A and B (144 and 148) are determined by a based band control signal. The CMSP antenna produces a modulated signal comprising symbols representing I and Q channels (see FIG. 4A) of the baseband control signal. The switches A 144 and B 148 are used to control the sign (positive or negative) of the modulation, while the variable attenuators A 142 and B 146 are used to control the relative amplitude of the I and Q channel. For a simple four state modulation format like QPSK, the attenuators A 142 and B 146 will only ever be maximally attenuated (no signal) or minimally attenuated (full strength signal). Table 1 illustrates the control of an RF carrier by the control system 140 in response to a QPSK baseband signal sequence of 00011011.

TABLE 1

Figure 4B:
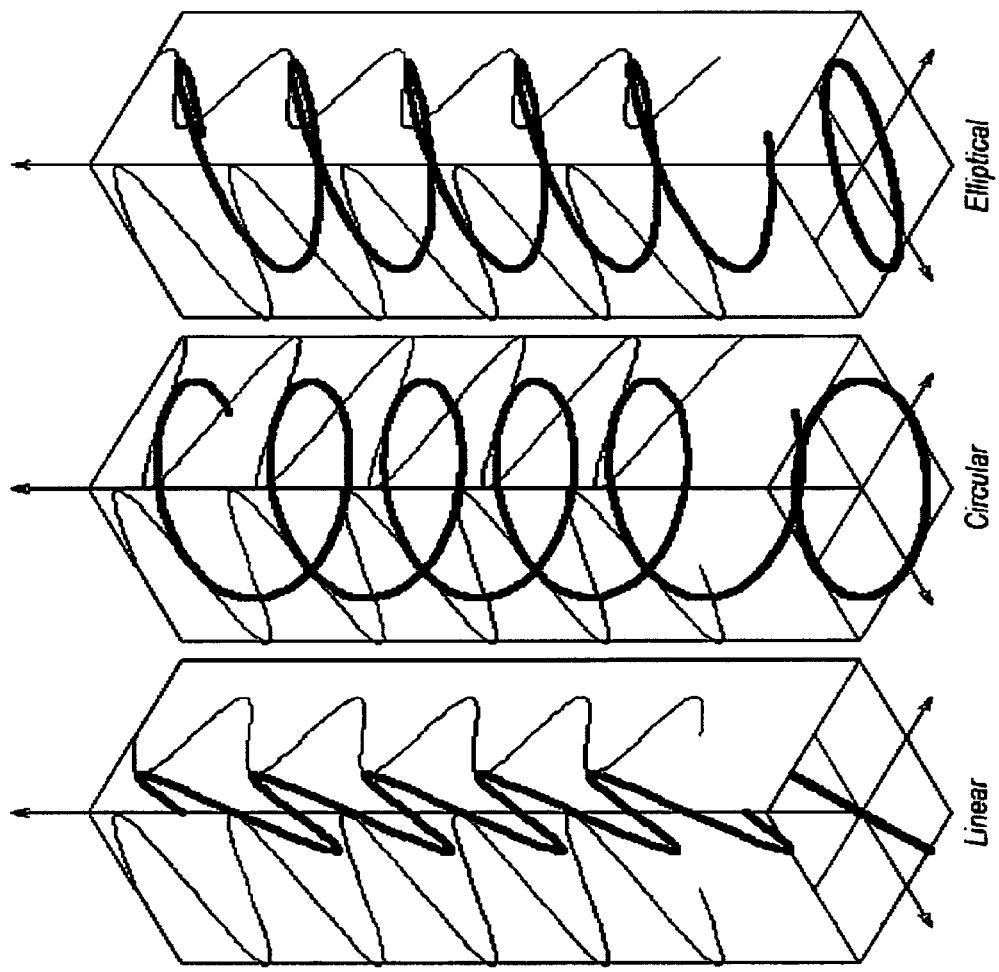
FIG. 4B is a graphical illustration linear, circular and elliptical polarization

Control States for Controller of FIG. 18 for the case of QPSK as depicted in FIG. 4A using the Circular Microstrip Patch Antenna of FIG. 17

| I | Q | Switch A | Switch B | Attenuator A | Attenuator B |
|---|---|----------|----------|--------------|--------------|
| 0 | 0 | Feedpoint C | Arbitrary | Minimum | Maximum |
| 0 | 1 | Arbitrary | Feedpoint D | Maximum | Minimum |
| 1 | 0 | Arbitrary | Feedpoint B | Maximum | Minimum |
| 1 | 1 | Feedpoint A | Arbitrary | Minimum | Maximum |

In another embodiment, the input signal is a modulated signal and the control signal is a pseudo-random (PN) code. In this embodiment, the CMSP antenna spreads the modulated signal in response to the PN code.

IQ DSAM and Circular Polarization

Figure 19:
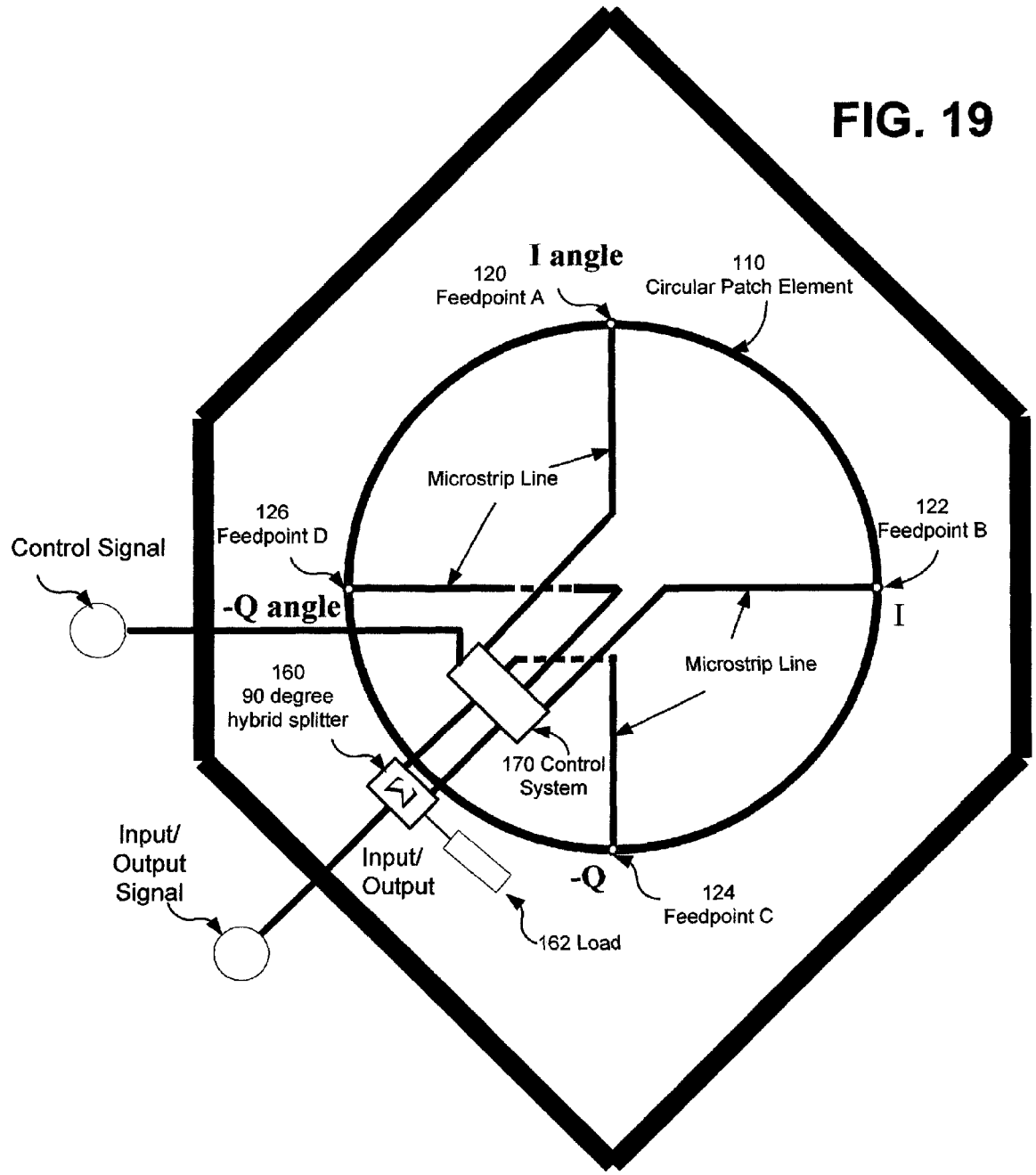
FIG. 19 is a block diagram illustrating a CMSP antenna configured to circular polarization according to an embodiment.

FIG. 19 is a block diagram illustrating a CMSP antenna configured to circular polarization according to an embodiment. A circular patch element 110 comprises feedpoints A, B, C and D (120, 122, 124, and 126 respectively). An input signal is applied to input/output 110 and split by ninety degree hybrid 160. The split signal is fed to a control system 170 that is responsive to a control signal. One branch of the split signal is directed to feedpoints A and B (120 and 122) and the other branch of the split signal is directed to feedpoints C and D (124 and 126). In this embodiment, the phase relationships and amplitudes of the signals applied to the feedpoints are controlled by the control system 170 to effect circular polarization and arbitrary modulation in the complex IQ plane.

Figure 20:
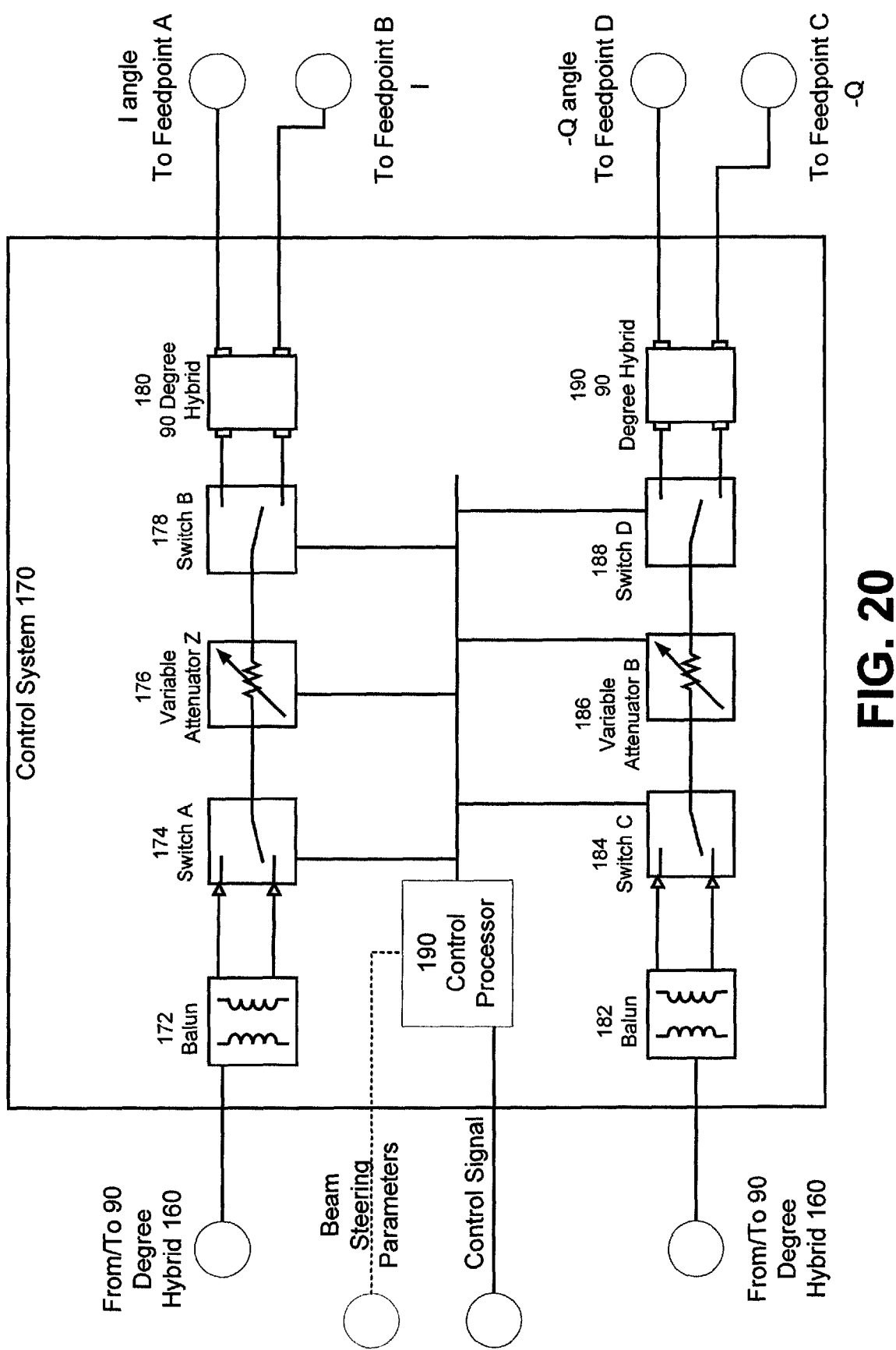
FIG. 20 is a block diagram illustrating a controller according to an embodiment.

FIG. 20 is a block diagram illustrating a controller according to an embodiment. A controller 170 comprises balun 172, switch A 174, variable attenuator A 176, switch B 178, 90 degree hybrid 180, balun 182, switch C 184, variable attenuator B 186, switch D 188, and 90 degree hybrid 190. The variable attenuators A and B (176 and 186)) and the switches A, B; C and D (174, 178, 184 and 188) are controlled by a control processor 192 that is responsive to a control signal. In the control system 170, the baluns (172 and 182) and 90 degree hybrids (180 and 190) are devices that control both the sign and phase (to the extent required for circular polarization only) of the antenna excitations applied to feedpoints A, B, C, and D. The variable attenuators A and B (176 and 186) are used to control the high-resolution IQ modulation aspects of the excitation signal not related to polarization. The feedpoint B (122) corresponds to the I channel of the modulation signal and the feedpoint C (124) corresponds to the –Q channel of the modulation signal. The phase-shifted feedpoint A (120) corresponds to the –90 degree-shifted I channel, required only for the purposes of inducing right-hand (RH) circular polarization, and the phase-shifted feedpoint D (126) corresponds to the +90 degree-shifted Q channel, also required only for the purposes of inducing RH circular polarization. The embodiment can also produce left-hand (LH) circular polarization. The switches A, B, C and D (174, 178, 184 and 188) along with the baluns 172 and 90 degree hybrids 180, therefore control both the sign of the modulation as well as enable circular polarization. The variable attenuators (176 and 186) control, with high resolution, the effective I and Q channel modulation amplitudes. For RH circular polarization, Table 2 shows • the phase contribution of the settings of switches A, B, C and D (174, 178, 184 and 188) for the feedpoint chain pair A and B (120, 122) as well as pair C and D (124, 126).

TABLE 2

Phase Contribution of Switch Settings for RH Circular Polarization for Control of Circular Microstrip Patch Antenna of FIG. 19

| If the modulation signal signs are: | | The switches for A and B pair should produce the phase: | | The switches for C and D pair should produce the phase: | |
|---|---|---|---|---|---|
| I | Q | Switch 174 | Switch 178 | Switch 174 | Switch 178 |
| + | + | 0 | 0 | 180 | –90 |
| + | – | 0 | 0 | 0 | –90 |
| – | – | 180 | 0 | 0 | –90 |
| – | + | 180 | 0 | 180 | –90 |

For LH circular polarization, Table 3 shows the phase contribution of the switch 174 and 178 settings for the feedpoint chain pair A and B (120, 122) as well as pair C and D (124, 126).

TABLE 3

Phase Contribution of Switch Settings for LH Circular Polarization for Control of Circular Microstrip Patch Antenna of FIG. 19

| If the modulation signal signs are: | | The switches for A and B pair should produce the phase: | | The switches for C and D pair should produce the phase: | |
|---|---|---|---|---|---|
| I | Q | Switch 174 | Switch 178 | Switch 184 | Switch 188 |
| + | + | 0 | –90 | 180 | 0 |
| + | – | 0 | –90 | 0 | 0 |
| – | – | 180 | –90 | 0 | 0 |
| – | + | 180 | –90 | 180 | 0 |

In an embodiment, the control processors 150 and 190 may comprise additional components including by way of illustration, memory, software and I/O components. Thus, the control processors 150 and 190 may be responsive to software instructions that may allow the function of the processors and thus the outputs of the CSMP antennas to be change either through user intervention or in response to external signals.

DSAM Beamforming and Phased Arrays

In an embodiment, a circular disk microstrip patch (CMSP) antenna is used. In an embodiment, a signal is applied to one or more ports of the CMSP to drive a set of spatial points of excitation corresponding to a desired data symbol field state. When the spatial points of excitation are driven in a mutually-exclusive fashion, "N" radiating CMSP elements may be used to implement phased-array control. In this operating mode, the same N individual element states are held constant from symbol period to symbol period. The signal that is applied to the array may be a modulated signal or unmodulated signal that utilizes the modulation capabilities of the DSAM array to affect data symbol modulation together with beam steering.

Various IQ DSAM embodiments make use of an equal energy state constraint such that the peak power of any given symbol state that may be used for data modulation is equal across all symbol states. This constraint restricts the all radiated symbols to the unit circle in the complex plane (see, FIGS. 8A and 8B), representing changes in phase but not amplitude. The equal energy restriction results in the computation of the I and Q port relative amplitude factors for a desired total control angle of φ as:

$$I(\varphi) := \frac{\tan(\varphi)}{\sqrt{\tan(\varphi)^2 + 1}} \tag{2}$$

$$Q(\varphi) := \frac{1}{\sqrt{\tan(\varphi)^2 + 1}} \tag{3}$$

where the tangent function only provides valid results over an angle of –90<φ<90. Extending the tangent function to the entire complex plane is handled by switching the sign of I or Q when the angle φ is greater than π/2.

The equal energy constraint is applied here in order to simplify the provided example and is not meant as a limitation. The relaxation of the equal energy constraint results in the ability to control the DSAM phased array modulation and array factor control input to be any value in the complex plane. Using arbitrary complex plane configurations allows for the application of the technology to amplitude-dependant modulation formats, such as QAM and PAM, and to advanced array drive applications including array amplitude tapers and mutual coupling compensation.

A phased array is an antenna made up of multiple antennas elements that can transmit the same signal, each transmitting at different phases. By enabling each element to transmit at different phases, a phased array takes advantage of the interference pattern between the emitted waves of the antenna components to electronically direct the radiation along a beam in desired direction or in a desired pattern. Interference occurs when waves of the same frequency either constructively interfere or destructively interfere (e.g. cancel each other out).

Figure 12B:
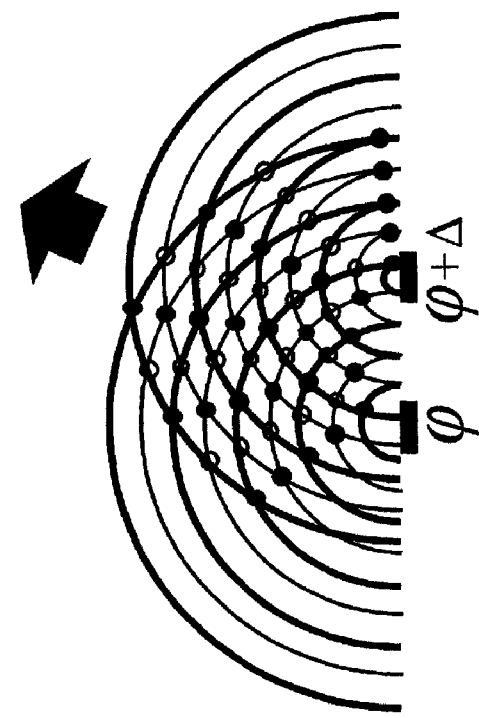
FIGS. 12A and 12B are graphical representations illustrating beam forming using an array having two antenna elements
Figure 12A:
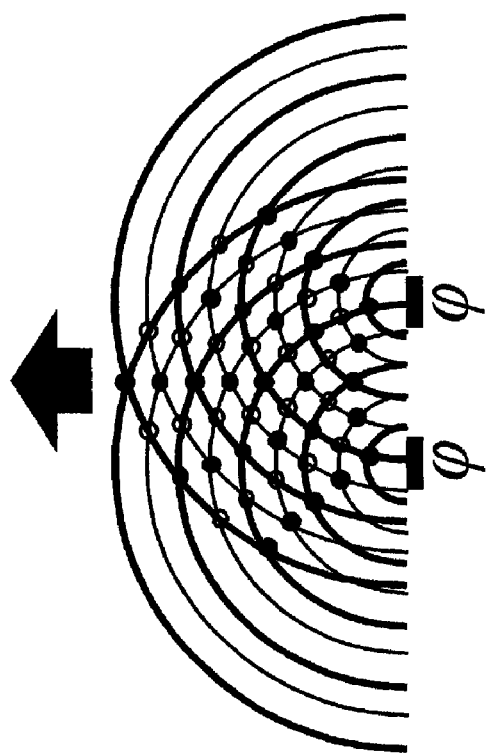

FIG. 12A is a graphical representation illustrating beam forming using an array having two antenna elements. Solid dots identify where the emitted waves amplify each other, and the circles indicate where they cancel. In the left example, the phase of the antennas is the same, so a wide beam is directed vertically. In the second example illustrated in FIG. 12B, the phase of the second element is shifted by approximately 100°. It is clear that the beam is steered to the right. With many antennas in an array, and with precise control of the phase of each element in an array, beams or more complex patterns can be directed very quickly and accurately.

Figure 13:
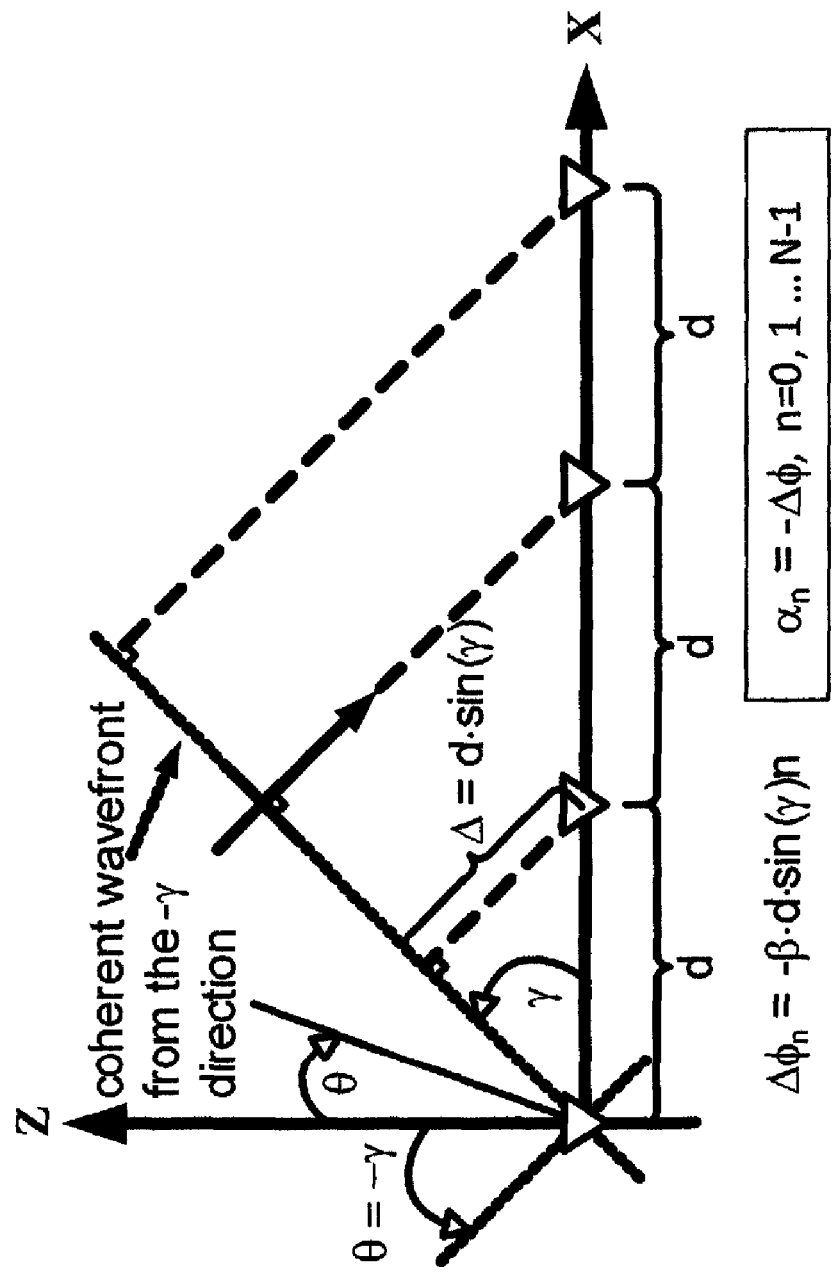
FIG. 13 is a graphical representation illustrating a simple one-dimensional phased array analysis geometry.

In more detail, the goal of simple beamforming is to align the phase response of the array with that of the outgoing or incoming planar wavefronts so as to result in maximum coherent combination of the signals transmitted or received from each element in the array at a desired pointing angle. The inter-element phase shift ($\Delta\phi_n$) required to achieve the beamforming effect is illustrated in FIG. 13.

Once the inter-element phase shift ($\Delta\phi$) is determined for each of the n={0, 1 . . . N−1} elements in the array for a desired pointing angle (−γ), the signal used to excite each array element is phase-shifted by $\alpha_n$. The inter-element phase shift is determined as a multiple of α=β×d×sin(−γ), where β is the propagation constant and d is the distance between antenna elements. For free space, the propagation constant is equal to 2π/λ, where λ is the wavelength of the frequency of operation of the array. The added effect of the array factor (AF(θ)) can be computed as a spatial term to be taken in product with the native radiated field pattern of the elements.

$$AF(\theta) = \sum_{n=0}^{N-1} e^{j(-\beta dn\sin(\theta)+\alpha_n)} \quad (4)$$

Figure 14A:
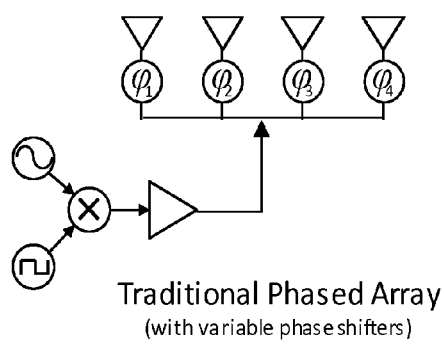
FIG. 14A illustrates a conventional phased array implementation as known in the art.

FIG. 14A is graphical representation illustrating a phased array as known in the prior art. As illustrated in FIG. 14A, to achieve phase shifting between the antennas in the arrays, variable phase shifters are used. Alternatively, each array element may be driven from a different source. These options are expensive and they prevent the development of small, inexpensive array antennas.

Figure 14B:
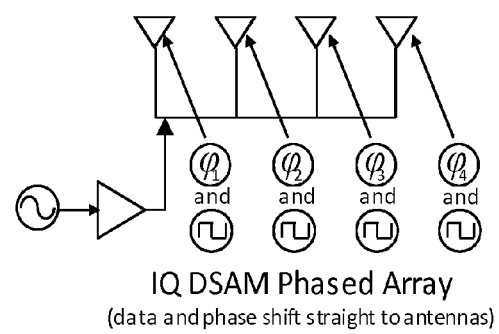
FIG. 14B is a block diagram that illustrates a four-element CMSP according to an embodiment.

Since IQ DSAM embodiments can control phase and amplitude arbitrarily, it is well suited for use in phased arrays. FIG. 14B is a graphical representation of an IQ DSAM phased array according to an embodiment. In an embodiment, a signal is applied to one or more ports of an IQ DSAM to drive a point of excitation corresponding to a desired data symbol field state. When the spatial ports are driven in a mutually-exclusive fashion, "N" radiating CMSP elements may be used to implement phased-array control.

The total phase required for $\phi$ depends on the desired application of the approach. The DSAM phased array example presented here can be used to perform DSAM data symbol modulation, DSAM phased array beamforming, or both simultaneously. The value of $\phi$ is equal to the sum of the desired data symbol phase value $\phi_d$ plus the phased array beamforming control angle phase value $\phi_a$. If either data symbol or array beamforming angle control is not required, then $\phi_d$ or $\phi_a$, respectively, are set to zero. The resulting value for $\phi$ is mapped into −π<$\phi$<π.

Figure 14C:
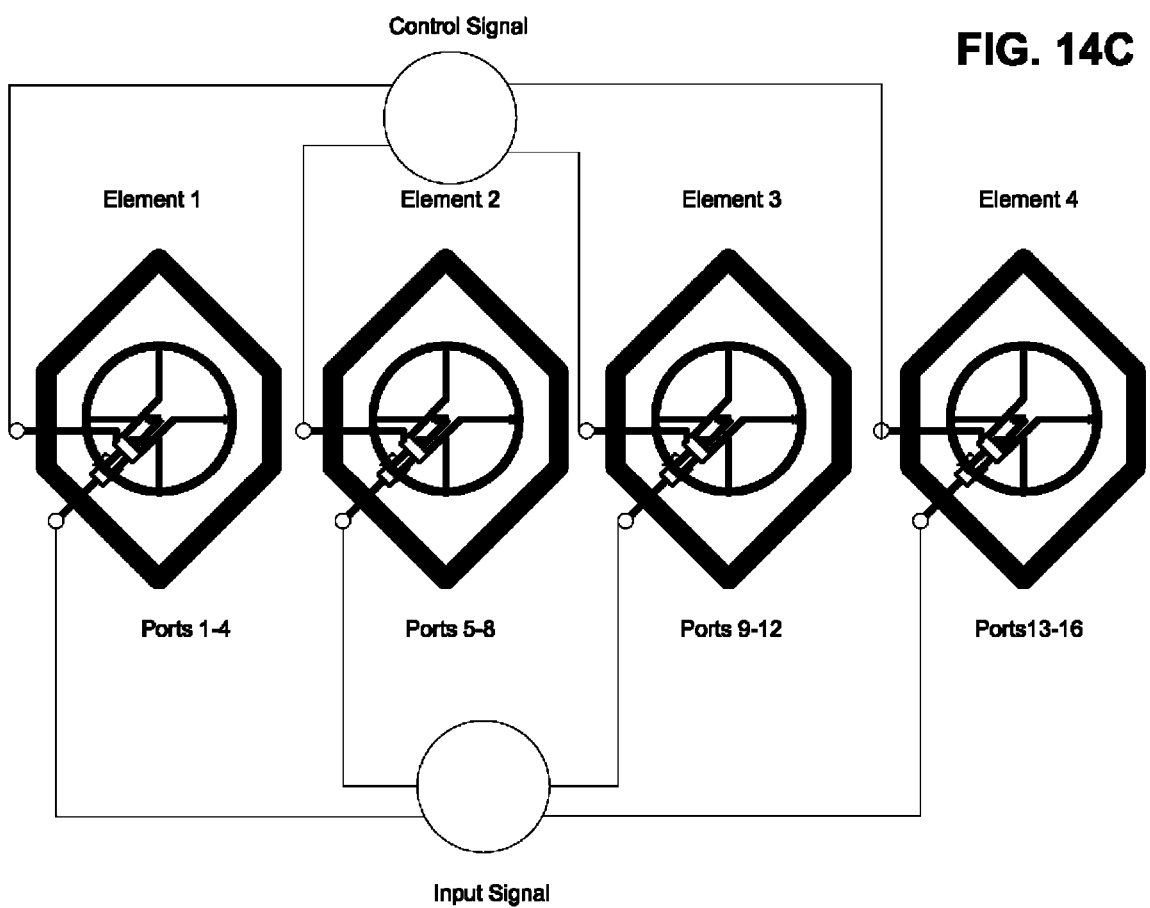
FIG. 14C is a block diagram that further illustrates a four-element CMSP according to an embodiment.

For example, a DSAM-based single polarization four-element linear array using CMSP antenna elements is illustrated in FIG. 14C. In this implementation, a variable attenuator may be used but no high-resolution variable phase shifters are required. The array may function as the sole modulation source, may be utilized with a conventional modulation source, or may act as a modulation aid.

By way of illustration and not by way of limitation, each CMSP antenna element in the array is a 990 mil radius disk of copper placed 20 mil above an $\in_r$=2.2 Rogers 5880 dielectric layer on top of a (theoretical) infinite copper groundplane. The array has 16 excitation ports, and is resonant at 2.436 GHz with an input impedance of approximately 250 Ohms, un-matched.

Simulated results for the array illustrated in FIG. 14C include four symbol states, {I,Q}={(0,0), (0,1), (1,0), (1,1)} corresponding to QPSK modulation points of {0, −90, 90, 180} on the unit circle in the complex plane. These symbol states are verified when the total phase making up $\phi_n$ in each case is the combination of the phase required by the data symbol states as well as an additional element-dependent phase contribution required to achieve power pattern beamforming. Therefore, several tables of results are provided, each for a given beamforming angle from the set {0°, −12°, −18°}, and each providing the result of four excitation sets, each of which corresponds to one of the desired four data symbol states.

TABLE 4

Array Excitation and Response for 0° Beamform Angle

| I | Q | θ DATA | EL1 (I, Q) | | EL2 | | EL3 | | EL4 | | RX mag | RX ang |
|---|---|---|---|---|---|---|---|---|---|---|---|---|
| 0 | 0 | 0 | 0 | 1 | 0 | 1 | 0 | 1 | 0 | 1 | 0.367 | −23.43 |
| 0 | 1 | −90 | −1 | 0 | −1 | 0 | −1 | 0 | −1 | 0 | 0.367 | −111.51 |
| 1 | 0 | 90 | 1 | 0 | 1 | 0 | 1 | 0 | 1 | 0 | 0.367 | 68.49 |
| 1 | 1 | 180 | 0 | −1 | 0 | −1 | 0 | −1 | 0 | −1 | 0.367 | 156.57 |

TABLE 5

Array Excitation and Response for −12° Beamform Angle

| I | Q | θ DATA | EL1 (I, Q) | | EL2 | | EL3 | | EL4 | | RX mag | RX ang |
|---|---|---|---|---|---|---|---|---|---|---|---|---|
| 0 | 0 | 0 | 0 | 1 | 0.866 | 0.5 | 0.866 | −0.5 | 0 | −1 | 0.326 | 78.11 |
| 0 | 1 | −90 | −1 | 0 | −0.5 | 0.866 | 0.5 | 0.866 | 1 | 0 | 0.324 | −19.41 |
| 1 | 0 | 90 | 1 | 0 | 0.5 | −0.866 | −0.5 | −0.866 | −1 | 0 | 0.324 | 160.56 |
| 1 | 1 | 180 | 0 | −1 | −0.866 | −0.5 | −0.866 | 0.5 | 0 | 1 | 0.326 | −101.89 |

TABLE 6

Array Excitation and Response for −18° Beamform Angle

| I | Q | θ DATA | EL1 (I, Q) | | EL2 | | EL3 | | EL4 | | RX mag | RX ang |
|---|---|---|---|---|---|---|---|---|---|---|---|---|
| 0 | 0 | 0 | 0 | 1 | 0.643 | 0.766 | 0.985 | 0.174 | 0.866 | −0.5 | 0.35 | 37.4 |
| 0 | 1 | −90 | −1 | 0 | −0.766 | 0.643 | −0.174 | 0.985 | 0.5 | 0.866 | 0.35 | −48.9 |
| 1 | 0 | 90 | 1 | 0 | 0.766 | −0.643 | 0.174 | −0.985 | −0.5 | −0.866 | 0.35 | 131.1 |
| 1 | 1 | 180 | 0 | −1 | −0.643 | −0.766 | −0.985 | −0.174 | −0.866 | 0.5 | 0.35 | −142.6 |

A summary of the data symbol responses are given below in Table 7.

TABLE 7

Array Excitation and Response Summary for all Beamforming Angles

| I | Q | θDATA | Delta Phase vs. 00 Symbol ($\phi_n = 0°$) | Error |
|---|---|---|---|---|
| BORESIGHT (0 degree control) | | | | |
| 0 | 0 | 0 | 0 | — |
| 0 | 1 | −90 | 88.08 | −1.92 |
| 1 | 0 | 90 | −91.92 | +1.92 |
| 1 | 1 | 180 | −180 | 0 |
| −12 DEGREES (40 degree control) | | | | |
| 0 | 0 | 0 | 0 | — |
| 0 | 1 | −90 | 86.3 | 3.7 |
| 1 | 0 | 90 | −93.7 | −3.7 |
| 1 | 1 | 180 | 180 | 0 |
| −18 DEGREES (60 degree control) | | | | |
| 0 | 0 | 0 | 0 | — |
| 0 | 1 | −90 | 97.52 | 7.52 |
| 1 | 0 | 90 | −82.45 | 7.55 |
| 1 | 1 | 180 | 180 | 0 |

The phased array control angle $\phi_a$ is not necessarily equal to the desired beamforming angle as the relationship between the two is determined through detailed computation or array calibration. DSAM provides the means to control the input phase control value from $-\pi<\phi_a<\pi$, with the corresponding main beam angle in general a matter of the specifics of the array configuration. The data symbol modulation embodied in $\phi_d$, on the other hand, does map directly through the modulated antenna structure.

By way of illustration and not by way of limitation, a 4-element CMSP array using DSAM-based I and Q port beamforming may be operated in the following modes. In this first mode, no beamforming is used, so the control setting, 4), for each element in the set {EL1, E12, EL3, EL4} is determined solely based on the desired data symbol of transmission.

For the data symbol represented by a $-\pi/2$ phase shift, computation of Equation 4 and Equation 5 yields −1 and 0, respectively. These I and Q control-port excitation values are valid for all elements in the array since no differential phase is being used to steer the array away from broadside. This straightforward application of Equation 4 and Equation 5 proceeds for all data symbols in the symbol set.

In another operating mode, a control system directs the 4-element CMSP array to steer a modulated signal. The control angle values computed in this section pertain to the use of the DSAM-based beamforming capability of the 4-element circular MSP array with an external modulated source. In this case, the required control phase values, $\phi$, are computed based only on the need to steer the array, not to express data symbol states.

With a control input setting of $\phi_a=40°$, the required differential phase at each element relative to the arrays first element is $\phi_a$ (n−1), resulting in control angle settings of {0, −12, −24, −36} for the element set {EL1, EL2, EL3, EL4}. Application of Equations 2 and 3, result in (I,Q) amplitude value pairs of {(0,1), (0.643, 0.766), (0.985, 0.174), (0.866, −0.5)}. These settings steer the main beam to −12° and correspond to the (0, 0) symbol state.

In another operating mode, the 4-element circular MSP array is used to steer and to provide data symbol modulation. In this case, the required control phase values, $\phi$, are computed based on the need to steer the array via $\phi_a$ as well as the need to express data symbol states via $\phi_d$.

In the example of this case, the total $\phi$ is the sum of the beam steering and data symbol portions. Taking the data symbol for $\phi_d=\pi$, this gives the control phase values for {EL1, EL2, EL3, EL4} as $\phi=\phi_d+\phi_a=\{180°, −140°, −100°, −60°\}$ when constrained to $(-\pi<\phi<\pi)$. This results in the (I, Q) amplitude pairs of {(0, −1), (−0.643, −0.766), (−0.985, −0.174), (−0.866, 0.5)}.

Spread Spectrum

Any radiated signal at a given frequency occupies a certain bandwidth. A pure, unmodulated carrier signal only operates at one frequency—theoretically it has zero bandwidth, but given noise and other factors it will have a very narrow bandwidth. When a signal is modulated the radiated pattern's energy is spread somewhat over a wider bandwidth.

It is often desired to spread a signal over a wider bandwidth, for example, by modulating at a much higher frequency (than the original modulation frequency) with a known pseudo-random (PN) code. This decreases the peak amplitude to levels below which the signal can be easily detected. Spreading also mitigates co-channel interference (interference caused by other signals operating in or near the same band) because interferers and/or jammers generally occupy a smaller proportion of the spread signal's band and they are processed out by the receiver. (See, FIGS. 15A and 15B.)

DSAM and Spread Spectrum

Figure 16A:
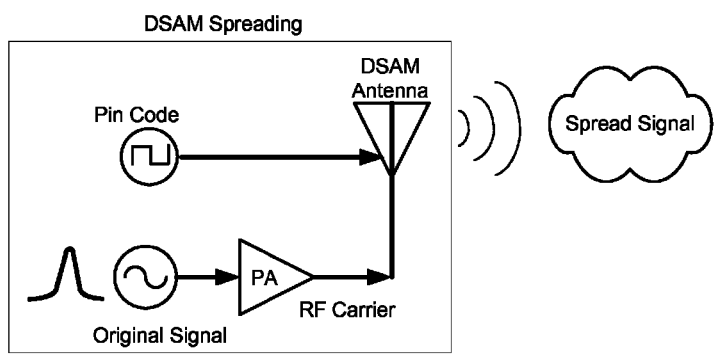
FIGS. 16A and 16B are graphical representations illustrating the use of DSAM antenna to perform spreading and dispreading according to embodiments.
Figure 16B:
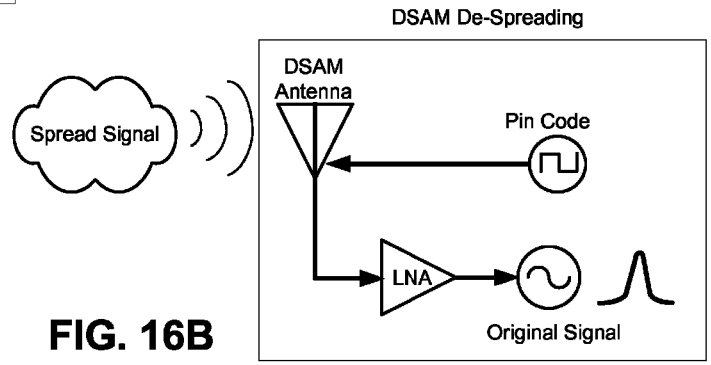

A DSAM control system and antenna can spread a premodulated signal by switching the signal to different spatial feedpoints much like it switches a carrier when used for modulation. However, for spreading, a high frequency pseudo-random noise (PN) coded sequence (sometimes referred to herein as a PN sequence or PN code) controls the switch rather than data. Unique to DSAM, a synchronized PN coded sequence can be applied to the receive end to return the original modulated signal without any typical active circuitry or complex processing (See, FIGS. 16A and 16B.).

In an embodiment, a DSAM-based antenna structure is used for signal spreading and de-spreading. By way of illustration and not as a limitation, in an embodiment, a DSAM antenna structure may be used in direct-sequence spread spectrum (DSSS) links. In this embodiment, both synchronized PN code and polarization phase may be required for proper demodulation of a received signal with DSAM. This requirement for proper synchronization between two aspects of the received signal for full de-spreading in DSAM adds a level of separation between the intended received signal and other users or jammers not present in non-DSAM approaches. This approach also lends itself to low probability of intercept communications.

The DSAM concept allows for despreading prior to the signal being processed in any active devices in the receiver. The demodulation of signals in a DSAM architecture thereby avoids a whole host of linearity issues associated with active devices such as low noise amplifiers and mixers that are necessarily present in a typical receive chain. For example, active components can be saturated by strong jamming signals, preventing successful communication. Since DSAM can uniquely provide interference signal suppression in a receiver without the use of active components to include co-channel interferers, it affords an aspect of interference rejection not available through any other known means.

DSAM Mathematical Foundations

Various aspects of DSAM disclosed above may be expressed in mathematical terms.

The spatial aspects of antenna structure excitation are emphasized in DSAM. The RF carrier excitation may be of a continuous wave (CW) nature. The differences between conventional pre-antenna modulation and DSAM are best illustrated by a short look at fundamental mathematical representations of the electric field in each case. For this work, the convention of:

$$\overline{E}(t) = Re\{\overline{E}e^{j\omega t}\} \quad (5)$$

is used, where the explicitly time-varying far-zone instantaneous electric field is $\overline{E}(t)$, the time-harmonic electric field is $\overline{E}$, and the time-harmonic carrier frequency is $\omega$.

To continue the illustration, the typical approach of treating the magnetic ($\overline{A}$) and electric ($\overline{F}$) vector potential of the antenna structure in order to determine the radiated electric ($\overline{E}$) or magnetic ($\overline{H}$) fields at distances far from the antenna is used. This approach applies to both conventional modulation and DSAM. The electric and magnetic fields of an antenna in this approach are determined as:

$$\overline{E} \cong -j\omega\overline{A} \quad (6)$$

where $$\overline{A} = \mu\iiint_{V'} \overline{J}G(r,r')dV' \quad (7)$$

and $$\overline{H} \cong -j\omega\overline{F} \quad (8)$$

where $$\overline{F} = \epsilon\iiint_{V'} \overline{M}G(r,r')dV' \quad (9)$$

and where $G(r,r')$ is the well-known free-space Green function in three dimensions, $\overline{J}$ and $\overline{M}$ are the electric and magnetic (conceptual) source current distributions, respectively. The integrations in (7) and (9) are performed over the "primed" source volume coordinates and then evaluated at the "unprimed" field coordinates.

For conventional modulation, the complex source excitation factor, $s_n$, is given as:

$$s_n = \alpha_n e^{j\Theta_n} \quad (10)$$

which represents a modulated information signal in the typical communication sense. In (10), $\alpha_n$ is the data symbol amplitude function, $e^{j\Theta_n}$ is the data symbol phase function, and each is expressed here as a constant value over the duration of the $n^{th}$ information symbol period, T. Equation (10) implies that a rectangular pulse function is in use. In the conventional modulation approach, all modulation of the outgoing wave takes place in terms of the time-varying excitation signal being presented to the fixed input terminals of the antenna.

With conventional modulation, the electric source current can be expressed as $$\overline{J}_n^{CONV} = \alpha_n e^{j\Theta_n}\overline{J} \quad (11)$$

where the modulated signal $s_n$ is applied to a primary antenna excitation current $\overline{J}$ that is constant for all $n=1, 2 \ldots N$ different possible information symbol states.

Breaking the conventional modulation approach down term by term reveals the implied distinction between the modulated signal $\alpha_n e^{j\Theta_n}$ and the basic antenna structure electromagnetic field response $\overline{E}$ when defining the total radiated field, $\overline{E}_n^{CONV}$:

$$\overline{E}_n^{CONV} = \alpha_n e^{j\Theta_n}\overline{E} \quad (12)$$

In (12), the carrier term $e^{j\omega t}$ has been suppressed as is typical, and the same approach can be taken to determine the magnetic field $\overline{H}_n^{CONV}$ or conventional modulation.

In conventional modulation, the excitation of the MSP is fixed (does not change) across information symbols during a transmission. Rather, the information is a time-varying signal imposed as a multiplication of the underlying antenna response as given in (12). In (12), the amplitude, phase, or both, of the information signal change in each $n^{th}$ information symbol transmission.

DSAM makes exclusive use of the spatial aspects of the antenna response itself, ignoring the method of typical modulation. In DSAM, each symbol is mapped directly to the electromagnetic field produced by the antenna structure itself by way of controlling where the excitation is present in each $n^{th}$ information symbol period. This spatial difference in excitation using a constant amplitude, constant phase source is defined:

$$\overline{J}_n^{DSAM} = \overline{J}_n \quad (13)$$

where each $n^{th}$ DSAM information symbol excitation $\overline{J}_n^{DSAM}$ is implemented through a re-location of a constant $\overline{J}$. The vector nature of the constant excitation results in the modulated symbol differences between each $\overline{J}_n$ achieved by DSAM.

The total radiated field for DSAM, $\overline{E}_n^{DSAM}$, is therefore defined as:

$$\overline{E}_n^{DSAM} = \overline{E}_n \quad (14)$$

where each DSAM symbol state is expressed through a different spatially-derived field state.

The fields produced by the MSP providing for the possibility of exciting any of the four edges (located at +Y, −Y, −X, and +X in the antenna coordinate system) are given below as (15) through (22). Excitation in each aperture of the MSP produce, in general, spherical coordinate system spatial angle responses with both θ and φ directed electric field components in the far-field.

Excitation along +Y produces an electric field:

$$E_\theta^{+Y} = -jk_0V_0L_Y\frac{e^{-jk_0r}}{4\pi r}P_{E_\theta^{+Y}} \quad (15)$$

where the pattern factor is:

$$P_{E_\theta^{+Y}} = -\text{sinc}\left(\frac{k_0 L_x}{2}\sin(\theta)\cos(\phi)\right) \times \cos\left(\frac{k_0 L_y}{2}\sin(\theta)\sin(\phi)\right) \times \left(\frac{1+\cos(\theta)}{2}\right)\sin(\phi) \quad (16)$$

and $$E_\phi^{+Y} = jk_0 V_0 L_Y \frac{e^{-jk_0 r}}{4\pi r} P_{E_\phi^{+Y}} \quad (17)$$

where the pattern factor is:

$$P_{E_\phi^{+Y}} = \text{sinc}\left(\frac{k_0 L_x}{2}\sin(\theta)\cos(\phi)\right) \times \cos\left(\frac{k_0 L_y}{2}\sin(\theta)\sin(\phi)\right) \times \left(\frac{1+\cos(\theta)}{2}\right)\cos(\theta)\cos(\phi) \quad (18)$$

Excitation along −X produces an electric field:

$$E_\theta^{-X} = -jk_0 V_0 L_X \frac{e^{-jk_0 r}}{4\pi r} P_{E_\theta^{-X}} \quad (19)$$

where the pattern factor is:

$$P_{E_\theta^{-X}} = \text{sinc}\left(\frac{k_0 L_y}{2}\sin(\theta)\sin(\phi)\right) \times \cos\left(\frac{k_0 L_x}{2}\sin(\theta)\cos(\phi)\right) \times \left(\frac{1+\cos(\theta)}{2}\right)\cos(\phi) \quad (20)$$

and $$E_\phi^{-X} = jk_0 V_0 L_X \frac{e^{-jk_0 r}}{4\pi r} P_{E_\phi^{-X}} \quad (21)$$

where the pattern factor is:

$$P_{E_\phi^{-X}} = \text{sinc}\left(\frac{k_0 L_y}{2}\sin(\theta)\sin(\phi)\right) \times \cos\left(\frac{k_0 L_x}{2}\sin(\theta)\cos(\phi)\right) \times \left(\frac{1+\cos(\theta)}{2}\right)\cos(\theta)\sin(\phi) \quad (22)$$

In Equations (15) through (22) and throughout this description, constants and parameters have the typical units and meanings. The −Y and +X fields produced are just the negative of the +Y and −X fields, respectively, and restricting the mathematical values of excitation to $I^Y=+/-\{0, 1, j\}$ and $I^{-X}=+/-\{0,1,j\}$ results in the total MSP field expression given as:

$$\bar{E}_{MSP}(\theta, \phi) = \hat{\theta}(I^{+Y}E_\theta^{+Y}(\theta,\phi) + I^{-X}E_\theta^{-X}(\theta,\phi)) + \hat{\phi}(I^{+Y}E_\phi^{+Y}(\theta,\phi) + I^{-X}E_\phi^{-X}(\theta,\phi)) \quad (23)$$

As long as the excitation values in Equation (23) are derived spatially, then the modulation is considered switched-DSAM. The conceptual complex or negative values of excitation required per the mathematical description of (14) meet this requirement in the case of the MSP antenna described here.

Using the field expression for the MSP just derived and presented as Equation (23), conventional modulation used with a QPSK modulation format can be defined as:

$$\bar{E}_n^{C\_QPSK}(0, 0) = \hat{x}(-j)e^{j\Theta_n}K \quad (24)$$

where the pattern is taken along the antenna boresight at the spatial angles ($\theta=0$, $\phi=0$) and the fixed antenna excitation uses $\{I^{+Y}=1, I^{-X}=0\}$ to achieve linear vertical polarization. The electric field factor, $K$, is defined as:

$$K = k_0 L \frac{e^{-jk_0 r}}{4\pi r} \quad (25)$$

For DSAM, a possible expression of QPSK with the MSP antenna, again along the boresight, can take the form of:

$$\bar{E}_n^{D\_QPSK}(0, 0) = \hat{x}(-j)I_n^{+Y}K + \hat{y}(j)I_n^{-X}K \quad (26)$$

where it is seen that both the vertical and horizontal components of the antenna polarization are in this case required to achieve QPSK modulation.

The mapping used to produce QPSK in both the conventional approach ($\alpha_n=1$) and in the case of DSAM modulation is given below in Tables 8(a)-(c). Table 8(a) depicts the excitation for both a conventional transmitter and a DSAM transmitter for the case of linearly-polarized QPSK. Table 8(b) depicts the excitation for both a conventional transmitter and DSAM QPSK transmitter for the case of RHCP polarization. Table 8(c) depicts the four basic receiver polarization response vector components describing vertical, horizontal, LHCP, and RHCP polarization state possibilities. In Tables 8(a)-(c), $\{I, Q\}$ represent the information bits, with $\Theta_n$ the corresponding required excitation in the conventional approach of (24), while $I_n^Y$ and $I_n^{-X}$ are the excitation required for the new DSAM approach in (26).

TABLES 8(a)-(c)

| I | Q | $\Theta_n$ | $I_n^Y$ | $I_n^{-X}$ |
|---|---|---|---|---|
| (a) | | | | |
| 0 | 0 | $-\frac{\pi}{2}$ | 0 | −1 |
| 0 | 1 | $\pi$ | −1 | 0 |
| 1 | 0 | 0 | 1 | 0 |
| 1 | 1 | $\frac{\pi}{2}$ | 0 | 1 |
| (b) | | | | |
| 0 | 0 | $-\frac{\pi}{2}$ | −j | −1 |
| 0 | 1 | $\pi$ | −1 | j |

TABLES 8(a)-(c)-continued

| 1 | 0 | 0 | 1 | $-j$ |
|---|---|---|---|---|
| 1 | 1 | $\frac{\pi}{2}$ | $-j$ | 1 |

(c)

| Polarization | $p + Y$ | $p - X$ |
|---|---|---|
| Vertical ($\hat{x}$) | 1 | 0 |
| Horizontal ($\hat{y}$) | 0 | 1 |
| Right-Hand Circular | $\frac{1}{\sqrt{2}}$ | $\frac{-j}{\sqrt{2}}$ |
| Left-Hand Circular | $\frac{1}{\sqrt{2}}$ | $\frac{j}{\sqrt{2}}$ |

For RHCP polarization, the conventional transmitter requires a different fixed antenna excitation, resulting in a different structural electric field response, leading to:

$$\overline{E}_n^{C\_QPSK\_RHCP}(0,0) = \frac{K}{\sqrt{2}}(\hat{x}(-j) + \hat{y}(j)(-j))e^{j\Theta_n} \quad (27)$$

To maintain equal-energy symbol states, the DSAM field response for the case of RHCP polarization is also defined as:

$$\overline{E}_n^{D\_QPSK\_RHCP}(0,0) = \frac{K}{\sqrt{2}}(\hat{x}(-j)I_n^{+Y} + \hat{y}(j)I_n^{-X}) \quad (28)$$

The receiver polarization response vector (p) is used to determine the net response of an in-coming transmitted signal at the receiver for both magnitude (29) and phase (30) portions of the response.

$$E_{RX}^M(\theta,\phi) = |\overline{E}(\theta,\phi)\cdot\overline{p}^*(\theta,\phi)| \quad (29)$$

$$E_{RX}^P(\theta,\phi) = \text{Arg}(\overline{E}(\theta,\phi)\cdot\overline{p}^*(\theta,\phi)) \quad (30)$$

where the "*" in Equations (29) and (30) represents the complex-conjugate operator.

Table 9 depicts the response at the receiver for different receive polarization types along the boresight of the main beam of the MSP field pattern when linear-polarized transmission is used. As shown, DSAM produces different responses depending on the characteristics of the receiver polarization and the effect that may be applied to achieve rejection of a transmitted signal by non-compatible receivers.

TABLE 9

Receiver Real and Imaginary Signal Components Based on Receiver Polarization State, Linear Transmit Polarization

| | | Conventional | | DSAM | |
|---|---|---|---|---|---|
| I | Q | $E_{RX}^M$ | $E_{RX}^P$ | $E_{RX}^M$ | $E_{RX}^P$ |
| | | Vertical ($\hat{x}$) Receive | | | |
| 0 | 0 | 1 | $-\frac{\pi}{2}$ | 0 | und. |
| 0 | 1 | 1 | $\pi$ | 1 | $\pi$ |

TABLE 9-continued

Receiver Real and Imaginary Signal Components Based on Receiver Polarization State, Linear Transmit Polarization

| | | Conventional | | DSAM | |
|---|---|---|---|---|---|
| I | Q | $E_{RX}^M$ | $E_{RX}^P$ | $E_{RX}^M$ | $E_{RX}^P$ |
| 1 | 0 | 1 | 0 | 1 | 0 |
| 1 | 1 | 1 | $\frac{\pi}{2}$ | 0 | und. |
| | | Horizontal ($\hat{y}$) Receive | | | |
| 0 | 0 | 0 | und. | 1 | $\pi$ |
| 0 | 1 | 0 | und. | 0 | und. |
| 1 | 0 | 0 | und. | 0 | und. |
| 1 | 1 | 0 | und. | 1 | 0 |
| | | RHCP Receive | | | |
| 0 | 0 | 0.707 | $-\frac{\pi}{2}$ | 0.707 | $-\frac{\pi}{2}$ |
| 0 | 1 | 0.707 | $\pi$ | 0.707 | $\pi$ |
| 1 | 0 | 0.707 | 0 | 0.707 | 0 |
| 1 | 1 | 0.707 | $\frac{\pi}{2}$ | 0.707 | $\frac{\pi}{2}$ |
| | | LHCP Receive | | | |
| 0 | 0 | 0.707 | $-\frac{\pi}{2}$ | 0.707 | $\frac{\pi}{2}$ |
| 0 | 1 | 0.707 | $\pi$ | 0.707 | $\pi$ |
| 1 | 0 | 0.707 | 0 | 0.707 | 0 |
| 1 | 1 | 0.707 | $\frac{\pi}{2}$ | 0.707 | $-\frac{\pi}{2}$ |

In Table 9, it is clear that DSAM can be used to both exactly reproduce the net effect of a typical QPSK transmission and also to achieve different results as well, depending on the polarization of the receive antenna. Due to the large number of possibilities with respect to transmitted polarization state, not all possible combinations are shown here. The next example illustrates identical results for conventional modulation and DSAM.

The results of Table 10 provide the net response at a receive antenna of different polarization types for the case of RHCP modulation per Equations (27) and (28). In this case, both conventional modulation and DSAM produce equivalent results.

TABLE 10

Receiver Real and Imaginary Signal Components Based on Receiver Polarization State, RHCP Transmit polarization

| | | Conventional | | DSAM | |
|---|---|---|---|---|---|
| I | Q | $E_{RX}^M$ | $E_{RX}^P$ | $E_{RX}^M$ | $E_{RX}^P$ |
| | | Vertical ($\hat{x}$) Receive | | | |
| 0 | 0 | 0.707 | $-\frac{\pi}{2}$ | 0.707 | $-\frac{\pi}{2}$ |
| 0 | 1 | 0.707 | $\pi$ | 0.707 | $\pi$ |
| 1 | 0 | 0.707 | 0 | 0.707 | 0 |
| 1 | 1 | 0.707 | $\frac{\pi}{2}$ | 0.707 | $\frac{\pi}{2}$ |

TABLE 10-continued

Receiver Real and Imaginary Signal Components Based on
Receiver Polarization State, RHCP Transmit polarization

| | | Conventional | | DSAM | |
|---|---|---|---|---|---|
| I | Q | $E_{RX}^M$ | $E_{RX}^P$ | $E_{RX}^M$ | $E_{RX}^P$ |
| Horizontal ($\hat{y}$) Receive | | | | | |
| 0 | 0 | 0.707 | $\pi$ | 0.707 | $\pi$ |
| 0 | 1 | 0.707 | $\frac{\pi}{2}$ | 0.707 | $\frac{\pi}{2}$ |
| 1 | 0 | 0.707 | $-\frac{\pi}{2}$ | 0.707 | $-\frac{\pi}{2}$ |
| 1 | 1 | 0.707 | 0 | 0.707 | 0 |
| RHCP Receive | | | | | |
| 0 | 0 | 1 | $-\frac{\pi}{2}$ | 1 | $-\frac{\pi}{2}$ |
| 0 | 1 | 1 | $\pi$ | 1 | $\pi$ |
| 1 | 0 | 1 | 0 | 1 | 0 |
| 1 | 1 | 1 | $\frac{\pi}{2}$ | 1 | $\frac{\pi}{2}$ |
| LHCP Receive | | | | | |
| 0 | 0 | 0 | und. | 0 | und. |
| 0 | 1 | 0 | und. | 0 | und. |
| 1 | 0 | 0 | und. | 0 | und. |
| 1 | 1 | 0 | und. | 0 | und. |

Different transmit polarization states produce different responses at the receiver, and indeed this is the basis for the highly-efficient DCP-DSAM modulation format that uses both RHCP and LHCP states to add an extra bit per symbol to the data stream relative to fixed-polarization QPSK.

As discussed above, the ports of a circular microstrip patch antenna may be mapped to I and Q components of a complex plane.

Analysis of the CMSP reveals that for excitation at the $\phi=0°$ port (port 1), the far-zone electric field components are given by (31) and (32). As shown in (28), there is a $\cos(\phi)$ behavior to the $E\theta$ component of the far-zone field, which should make intuitive sense since a unit excitation at port 1 should result in a natural zero phase modal maximum at that location.

$$E_\theta = -j\frac{k_0 a_e V_0 e^{-jk_0 r}}{2r}\cos\phi J'_{02} \quad (31)$$

$$E_\phi = j\frac{k_0 a_e V_0 e^{-jk_0 r}}{2r}\cos\theta\sin\phi J_{02} \quad (32)$$

where $$K2 = \frac{k_0 a_e V_0 e^{-jk_0 r}}{2r} \quad (33)$$

and $$J'_{02} = J_0(k_0 a_e \sin\theta) - J_2(k_0 a_e \sin\theta) \quad (34)$$

and $$J_{02} = J_0(k_0 a_e \sin\theta) + J_2(k_0 a_e \sin\theta) \quad (35)$$

In (34) and (35), $J_0$ is the zero order Bessel function of the first kind, $J_2$ is the second order Bessel function of the first kind, and j is the constant value of the square root of negative one. In (31-33), $k_0$ is the free-space wavenumber, $a_e$ is the effective radius of the CMSP antenna, $V_0$ is the peak excitation voltage at the port, and r is the distance to the field measurement point.

Applying DSAM to the CMSP antenna involves determining the relative far-zone electric field response of the structure when excited from any of the different spatial excitation ports under consideration. Rather than re-derive the modes in the antenna structure, a pattern analysis technique based on vector coordinate transformation is applied. Rotating the feed point of the antenna by $\phi_n$ for each of the N excitation ports $\{n=1, 2, \ldots N\}$ transforms (31) and (32) to (36) and (37)

$$E_\theta^{\phi'_m{}'}=K2[-jJ'_{02}\cos(\phi)(\cos^2(\theta)\cos(\phi'_m)+\sin^2(\theta))+jJ_{02}\cos^2(\theta)\sin(\phi)\sin(\phi'_m)] \quad (36)$$

$$E_\phi^{\phi'_m}=K2[jJ'_{02}\cos(\theta)\cos(\phi)\sin(\phi'_m)+jJ_{02}\cos(\theta)\sin(\phi)\cos(\phi'_m)] \quad (37)$$

where K2 retains the definition in (33).

It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

What is claimed is:

1. A direct spatial antenna modulation (DSAM) system comprising:
   a radiating structure comprising a plurality of spatial points of origination; and
   a control system, wherein the control system is connected to the radiating structure via N spatial points of origination, wherein N is equal to or greater than 2, and wherein the control system is configured to perform operations comprising:
   receiving an unmodulated carrier and a baseband data signal;
   splitting the unmodulated carrier into N signals;
   adjusting an amplitude of each of the N signals in response to the baseband signal;
   assigning a spatial point of origination to each of the N signals; and
   simultaneously applying each of the N signals to the assigned spatial point of origination to emit from the radiating structure a radio frequency signal having one of M modulation states, where M is greater than N.

2. The DSAM system of claim 1, wherein adjusting the amplitude of each of the N signals in response to the baseband signal determines a modulation characteristic of a signal transmitted by the radiating structure selected from the group consisting of an instantaneous phase, an amplitude, and a polarization.

3. The DSAM system of claim 1, wherein a unique data symbol is associated with two or more of the N spatial points of origination and two or more of the N signals, and wherein the operation of simultaneously applying each of the N signals to the assigned spatial point of origination comprises directing the two or more signals associated with the unique data symbol to the two or more points of origination associated with the unique data symbol in response to the presence of the unique data symbol in the baseband data signal.

4. The DSAM system of claim 1, wherein the signal emitted by the radiating structure conforms to a modulation scheme that is selected from the group consisting of a quadrature phase shift keying (QPSK), binary phase shift keying (BPSK), M-Ary, and dual circular polarized QPSK.

5. The DSAM system of claim 1, wherein the control system comprises one or more switching devices and wherein the operation of simultaneously applying each of the N signals to the assigned spatial point of origination comprises simultaneously applying each of the N signals to the assigned spatial point of origination by controlling the state of the one or more switching devices in response to the baseband data signal.

6. The DSAM system of claim 1, wherein the control system comprises one or more amplitude control devices and wherein the operation of adjusting an amplitude of each of the N signals in response to the baseband signal comprises configuring the one or more amplitude control devices to adjust the amplitude of each of the signals in response to the baseband data signal.

7. The DSAM system of claim 1, wherein the radiating structure is selected from the group consisting of a rectangular microstrip patch antenna, a circular disc microstrip patch antenna, a quadrifilar helix antenna, a waveguide horn antenna, a crossed dipole antenna, and a dual-arm sinuous antenna.

8. The DSAM system of claim 1,
wherein the control system comprises one or more switching devices and
wherein the operations of adjusting an amplitude and assigning a spatial point of origination further comprise:
identifying a binary sequence in the baseband data signal;
arranging the binary sequence as unique symbols comprising one or more bits, wherein a unique data symbol is associated with two or more of the N spatial points of origination and two or more of the N signals, and
controlling the state of the one or more switching devices in response to the presence of the unique data symbol in the baseband data signal to direct the two or more signals associated with the unique data symbol to the two or more points of origination associated with the unique data symbol.

9. The DSAM system of claim 8, wherein the control system is configured to perform the further operations comprising applying a fixed phase shift to at least one of the N signals in response to the baseband signal prior to the applying operation.

10. A method of modulating a signal in a radiating structure comprising:
receiving by a control system an unmodulated carrier and a baseband data signal;
splitting by the control system the unmodulated carrier into N signals, wherein N is equal to or greater than 2;
adjusting by the control system an amplitude of each of the N signals in response to the baseband signal;
assigning by the control system one of N spatial points of origination of the radiating structure to each of the N signals; and
simultaneously applying by the control system each of the N signals to the assigned spatial point of origination to emit from the radiating structure a radio frequency signal having one of M modulation states, where M is greater than N.

11. The method of claim 10, wherein adjusting the amplitude of each of the N signals in response to the baseband signal determines a modulation characteristic of a signal transmitted by the radiating structure selected from the group consisting of an instantaneous phase, an amplitude, and a polarization.

12. The method of claim 10 further comprises associating by the control system a unique data symbol with two or more of the N spatial points of origination and two or more of the N signals, and wherein simultaneously applying each of the N signals to the assigned spatial point of origination comprises directing the two or more signals associated with the unique data symbol to the two or more points of origination associated with the unique data symbol.

13. The method of claim 10, wherein the signal emitted by the radiating structure conforms to a modulation scheme that is selected from the group consisting of a quadrature phase shift keying (QPSK), binary phase shift keying (BPSK), M-Ary, and dual circular polarized QPSK.

14. The method of claim 10, wherein the control system comprises one or more switching devices and wherein simultaneously applying each of the N signals to the assigned spatial point of origination comprises controlling by the control system the state of the one or more switching devices in response to the baseband data signal to simultaneously apply each of the N signals to the assigned spatial point of origination.

15. The method of claim 10, wherein the control system further comprises one or more amplitude control devices, wherein adjusting by the control system an amplitude of each of the N signals in response to the baseband signal comprises controlling by the control system the one or more amplitude control devices to adjust the amplitude of each of the signals in response to the baseband data signal.

16. The method of claim 10, wherein the radiating structure is selected from the group consisting of a rectangular microstrip patch antenna, a circular disc microstrip patch antenna, a quadrifilar helix antenna, a waveguide horn antenna, a crossed dipole antenna, and a dual-arm sinuous antenna.

17. The method of claim 10, wherein the control system comprises one or more switching devices and adjusting an amplitude and assigning a spatial point of origination further comprise:
identifying by the control system a binary sequence in the baseband data signal;
arranging by the control system the binary sequence as unique symbols comprising one or more bits, wherein the unique data symbol is associated with two or more of the N spatial points of origination and two or more of the N signals; and
controlling by the control system the state of the one or more switching devices in response to the presence of the unique data symbol in the baseband data signal to direct the two or more signals associated with the unique data symbol to the two or more points of origination associated with the unique data symbol.

18. The method of claim 17 further comprising applying by the control system a fixed phase shift to at least one of the N signals in response to the baseband data signal prior to the applying step.

* * * * *